(12) United States Patent
Jang et al.

(10) Patent No.: US 12,391,214 B2
(45) Date of Patent: Aug. 19, 2025

(54) VEHICLE AND MOBILE DEVICE FOR ACTIVATING A DIGITAL KEY

(71) Applicants: Hyundai Motor Company, Seoul (KR); Kia Corporation, Seoul (KR)

(72) Inventors: Yocheol Jang, Suwon-si (KR); HeeJin Ro, Seoul (KR); Duckyoung Kim, Seongnam-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 29 days.

(21) Appl. No.: 18/353,283

(22) Filed: Jul. 17, 2023

(65) Prior Publication Data

US 2024/0190384 A1   Jun. 13, 2024

(30) Foreign Application Priority Data

Dec. 10, 2022   (KR) .................. 10-2022-0172111

(51) Int. Cl.
  *B60R 25/20*   (2013.01)
(52) U.S. Cl.
  CPC ........ *B60R 25/20* (2013.01); *B60R 2325/205* (2013.01)
(58) Field of Classification Search
  None
  See application file for complete search history.

(56) References Cited

U.S. PATENT DOCUMENTS

| | | | |
|---|---|---|---|
| 10,124,768 B1 | 11/2018 | Bocca et al. | |
| 10,328,899 B2 | 6/2019 | Golsch | |
| 2014/0132391 A1 | 5/2014 | Eder | |
| 2015/0312774 A1* | 10/2015 | Lau | G05D 1/0274 455/446 |
| 2017/0158169 A1 | 6/2017 | Luo et al. | |
| 2018/0255426 A1* | 9/2018 | Liao | H04W 4/021 |
| 2024/0057030 A1* | 2/2024 | Barbello | H04W 48/18 |

FOREIGN PATENT DOCUMENTS

| | | |
|---|---|---|
| JP | 2019535931 A | 12/2019 |
| KR | 20200003502 A | 1/2020 |
| KR | 20200006533 A | 1/2020 |
| KR | 20200111484 A | 9/2020 |

* cited by examiner

*Primary Examiner* — John F Mortell
(74) *Attorney, Agent, or Firm* — Slater Matsil, LLP

(57) ABSTRACT

In an embodiment, a vehicle and/or a mobile device obtains relative position information of surrounding wireless communication apparatuses based on received signal strengths of the wireless communication apparatuses received by a communication device, generates the relative positions of the wireless communication apparatuses as a constellation map, generates a print pattern based on the position of the constellation map, and controls activation of a digital key based on the print pattern corresponding to the constellation map.

20 Claims, 14 Drawing Sheets

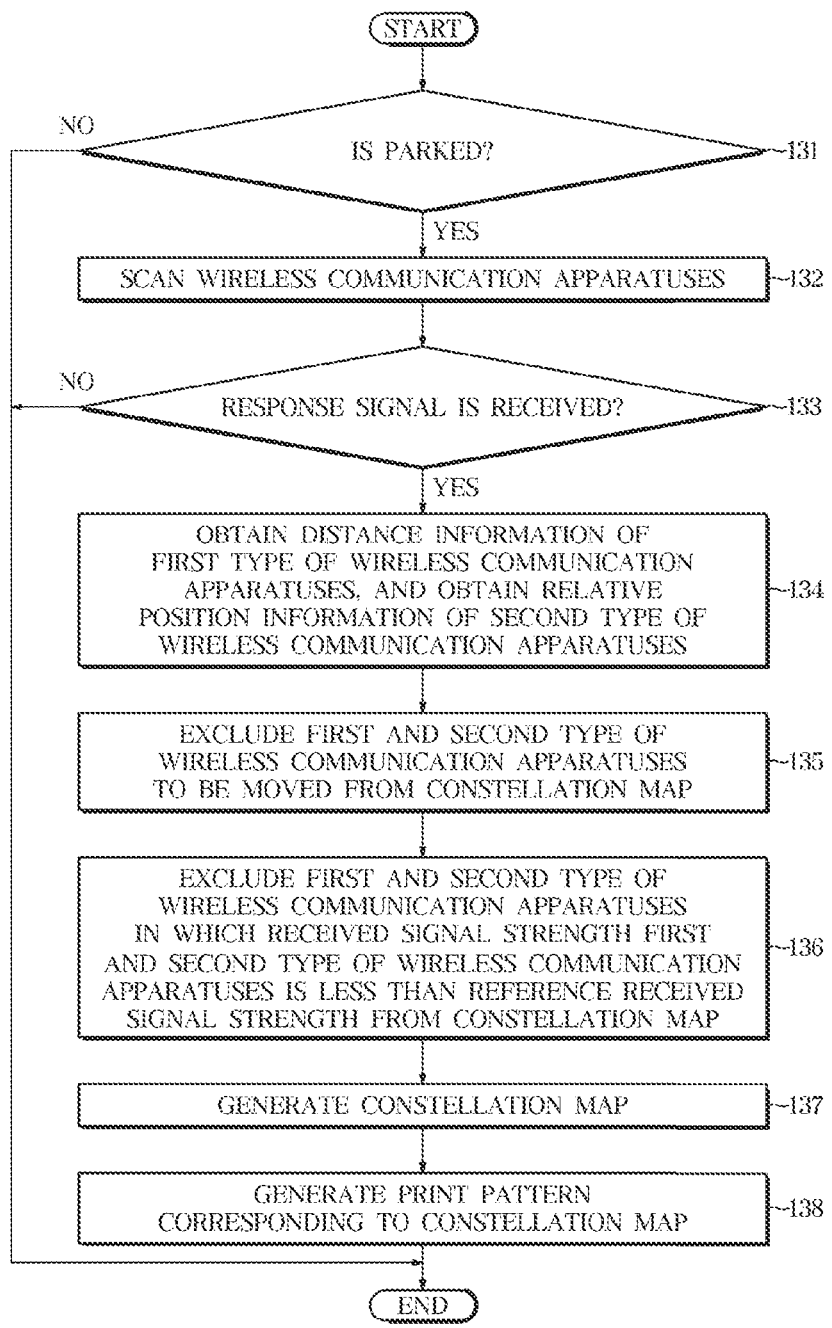

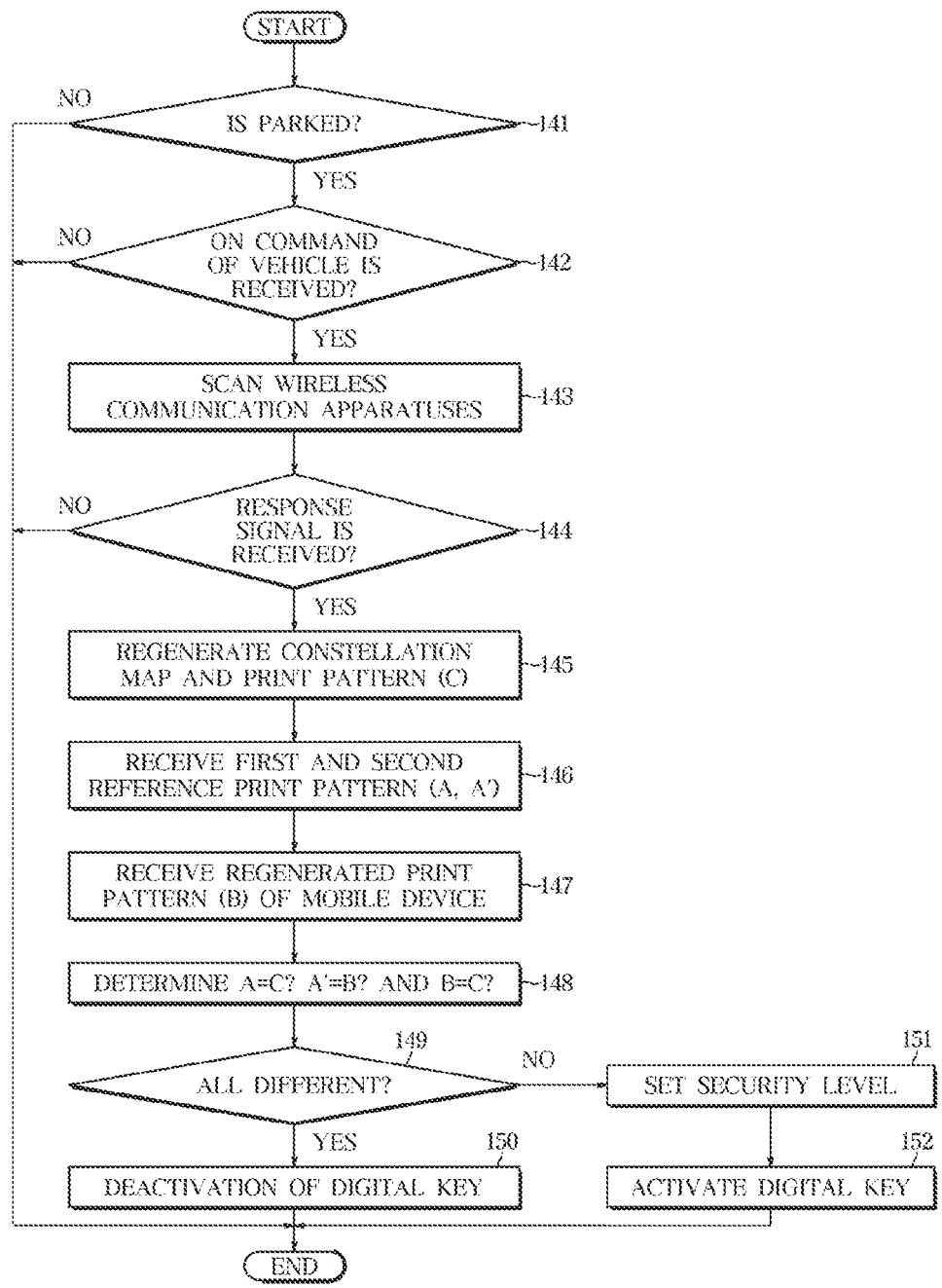

VEHICLE AND MOBILE DEVICE FOR ACTIVATING A DIGITAL KEY

CROSS-REFERENCE TO RELATED APPLICATIONS

This application claims the benefit of Korean Patent Application No. 10-2022-0172111, filed on Dec. 10, 2022, which application is hereby incorporated herein by reference.

TECHNICAL FIELD

Embodiments of the present disclosure relate to a vehicle and a mobile device for enhancing a security of a digital key.

BACKGROUND

The statements in this section merely provide background information related to the present disclosure and may not constitute prior art.

A vehicle can be locked or unlocked by a key or a remote controller, and the engine can also be turned on or off.

The remote controller performs two-way communication with the vehicle so that a user (e.g., a driver) can open the door or trunk by automatically unlocking the door of the vehicle when it is close to the vehicle without requiring separate manual operation, and also allows the vehicle to be started when the ignition button is operated without manually starting the vehicle while driving.

Recently, control technologies that enable communication between the vehicle and a mobile device have been developed. Accordingly, the user can use the mobile device to control the door opening and closing, door locking and starting of the vehicle.

The vehicle whose door opening/closing, door locking and starting are controlled by communication with the mobile device may indirectly communicate with the remote controller by a repeater relaying communication. However, it caused problems that the vehicle could be stolen.

For example, even if the mobile device of the user is far away, the repeater existing between the vehicle and the mobile device transmits a RF signal of the mobile device to the vehicle through a relay attack using a Bluetooth BLE Broadcasting communication method. In this case, it is determined that the vehicle is located close to the mobile device of the user. Using these techniques, hackers steal vehicles by hacking into them.

SUMMARY

Embodiments of the present disclosure relate to a vehicle and a mobile device for enhancing a security of a digital key. In an embodiment of the disclosure, a vehicle scans wireless communication apparatuses when the vehicle is in a parked or stopped state, generates and stores a print pattern of a constellation map based on the received signal strength of each of the scanned wireless communication apparatuses, and controls activation and deactivation of a digital key in a mobile device based on the stored print pattern of the constellation map.

In accordance with an embodiment of the disclosure, a vehicle may include a communication device configured to communicate with wireless communication apparatuses and a mobile device in which a digital key is stored. The vehicle may further include a processor configured to obtain relative position information of each of the wireless communication apparatuses based on a received signal strength of each of the wireless communication apparatuses received by the communication device, generate a constellation map based on the obtained relative position information of each of the wireless communication apparatuses, generate a print pattern corresponding to the constellation map based on a position of the vehicle, and control activation of the digital key based on the generated print pattern.

The vehicle may include an input device and a memory. The processor of the vehicle may be configured to, in response to receiving an off command of the vehicle by the input device, control the communication device to scan the wireless communication apparatuses, and control the memory to store the print pattern corresponding to the constellation map generated in response to the scan of the wireless communication apparatuses as a first reference print pattern corresponding to a first reference constellation map.

The processor of the vehicle may be configured to, in response to receiving the off command of the vehicle by the input device, control the communication device to rescan the wireless communication apparatuses, regenerate the print pattern corresponding to the constellation map and the constellation map of the vehicle in response to the rescanning of the wireless communication apparatuses, and in response to the regenerated print pattern and the first reference print pattern being the same, control the activation of the digital key, and in response to the regenerated print pattern and the first reference print pattern being different from each other, control deactivation of the digital key.

The processor of the vehicle may be configured to set a security level to a first level, in response to the regenerated print pattern and the first reference print pattern being the same.

The processor of the vehicle may be configured to, in response to receiving the off command of the vehicle by the input device, receive a second reference print pattern corresponding to a second reference constellation map from the mobile device, control the memory to store the received second reference print pattern corresponding to the second reference constellation map. The processor of the vehicle may be configured to, in response to receiving an on command of the vehicle by the input device, receive a print pattern of the mobile device corresponding to a constellation map of the mobile device regenerated by the mobile device from the mobile device. The processor of the vehicle may be configured to, in response to the received print pattern of the mobile device and the second reference print pattern being the same, control the activation of the digital key. The processor of the vehicle may be configured to, in response to the received print pattern of the mobile device and the second reference print pattern being different from each other, control the deactivation of the digital key.

The processor of the vehicle may be configured to set a security level to a second level, from each other the received print pattern of the mobile device and the second reference print pattern being the same.

The processor of the vehicle may be configured to set a security level to a third level, in response to the regenerated print pattern of the vehicle and the first reference print pattern being the same and in response to the received print pattern of the mobile device and the second reference print pattern being the same.

The processor of the vehicle may be configured to set a security level to a fourth level, in response to the regenerated print pattern of the vehicle and the first reference print pattern being the same, in response to the received print pattern of the mobile device and the second reference print pattern being the same, and in response to the regenerated print pattern of the vehicle and the received print pattern of the mobile device being the same.

The processor of the vehicle may be configured to, in response to receiving an on command of the vehicle received by the input device, compare a second reference print pattern of the mobile device corresponding to a second reference constellation map received from the mobile device with the first reference print pattern of the vehicle corresponding to the first reference constellation map stored in the memory. The processor of the vehicle may be configured to, in response to the second reference print pattern of the mobile device and the first reference print pattern of the vehicle being the same, control the activation of the digital key. The processor of the vehicle may be configured to, in response to the second reference print pattern of the mobile device and the first reference print pattern of the vehicle being different from each other, control the deactivation of the digital key.

The processor of the vehicle may be configured to, in response to receiving the off command of the vehicle by the input device, identify a received signal strength of each first type of wireless communication apparatus received by the communication device, obtain relative distance information of each of the first type of wireless communication apparatuses based on the received signal strength of each of the first type of wireless communication apparatuses, generate the constellation map based on the relative distance information of each of the first type of wireless communication apparatuses, and generate the print pattern corresponding to the constellation map.

The processor of the vehicle may be configured to, in response to receiving the off command of the vehicle by the input device, identify a received signal strength and position information of each second type of wireless communication apparatus received by the communication device, obtain relative distance information of each of the second type of wireless communication apparatuses based on the received signal strength and the position information of each of the second type of wireless communication apparatuses, generate the constellation map based on the relative distance information of each of the second type of wireless communication apparatuses, and generate the print pattern corresponding to the generated constellation map. A communication method of the second type of wireless communication apparatuses of the vehicle may be different from a communication method of the first type of wireless communication apparatuses.

The processor of the vehicle may be configured to identify identification information of each of the first and second type of wireless communication apparatuses, identify movable first and second type of wireless communication apparatuses based on the identified identification information of each of the first and second type of wireless communication apparatuses, and exclude the identified movable first and second type of wireless communication apparatuses from the first and second type of wireless communication apparatuses for generating the constellation map.

The processor of the vehicle may be configured to identify the first and second type of wireless communication apparatuses having the received signal strength less than a reference received signal strength among the first and second types of wireless communication apparatuses, and exclude the identified first and second type of wireless communication apparatuses from the first and second type of wireless communication apparatuses for generating the constellation map.

The processor of the vehicle may be configured to transmit the generated constellation map or the generated print pattern corresponding to the generated constellation map to a server.

In accordance with an embodiment of the disclosure, a mobile device may include a memory configured to store a digital key to control a vehicle. The mobile device may further include a communication device configured to communicate with wireless communication apparatuses and the vehicle. The mobile device may further include a processor configured to obtain relative position information of each of the wireless communication apparatuses based on a received signal strength of each of the wireless communication apparatuses received by the communication device, generate a constellation map based on the obtained relative position information of each of the wireless communication apparatuses, generate a print pattern corresponding to the constellation map based on a position of the mobile device, control the memory to store the generated print pattern corresponding to the constellation map, and control the communication device to transmit the generated print pattern corresponding to the constellation map to the vehicle.

The processor of the mobile device may be configured to, in response to receiving an on command of the vehicle from the communication device, control the communication device to scan the wireless communication apparatuses, control the memory to store the print pattern corresponding to the constellation map generated in response to the scanning of the wireless communication apparatuses as a second reference print pattern corresponding to a second reference constellation map, and in response to scanning the vehicle, control the communication device to rescan the wireless communication apparatuses, regenerate the print pattern corresponding to the constellation map and the constellation map of the vehicle in response to the rescanning of the wireless communication apparatuses, and control the communication device to transmit the regenerated print pattern corresponding to the regenerated constellation map to the vehicle.

The processor of the mobile device may be configured to, in response to receiving the off command of the vehicle from the input device, identify a received signal strength of each first type of wireless communication apparatus received by the communication device, obtain relative distance information of each of the first type of wireless communication apparatuses based on the received signal strength of each of the first type of wireless communication apparatuses, generate the constellation map based on the relative distance information of each of the first type of wireless communication apparatuses, and generate the print pattern corresponding to the constellation map.

The processor of the mobile device may be configured to, in response to receiving the off command of the vehicle from the input device, identify a received signal strength and position information of each second type of wireless communication apparatus received by the communication device, obtain relative distance information of each of the second type of wireless communication apparatuses based on the received signal strength and the position information of each of the second type of wireless communication apparatuses, generate the constellation map based on the relative distance information of each of the second type of wireless communication apparatuses, and generate the print pattern corresponding to the constellation map. A communication method of the second type of wireless communication apparatuses of the mobile device may be different from a communication method of the first type of wireless communication apparatuses.

The processor of the mobile device may be configured to identify identification information of each of the first and second type of wireless communication apparatuses, identify movable first and second type of wireless communication apparatuses based on the identified identification information of each of the first and second type of wireless communication apparatuses, and exclude the identified movable first and second type of wireless communication apparatuses from the first and second type of wireless communication apparatuses for generating the constellation map.

The processor of the mobile device may be configured to identify the first and second type of wireless communication apparatuses having the received signal strength less than a reference received signal strength among the first and second type of wireless communication apparatuses, and exclude the identified first and second type of wireless communication apparatuses from the first and second type of wireless communication apparatuses for generating the constellation map.

BRIEF DESCRIPTION OF THE DRAWINGS

These and/or other embodiments of the disclosure may become apparent and more readily appreciated from the following description of the embodiments, taken in conjunction with the accompanying drawings, in which:

FIG. 11 is a view illustrating a flowchart of generating a print pattern of a constellation map of a vehicle according to an embodiment of the disclosure; and FIG. 12 is a view illustrating a control flowchart of a vehicle according to an embodiment of the disclosure.

DETAILED DESCRIPTION OF ILLUSTRATIVE EMBODIMENTS

Figure 1:
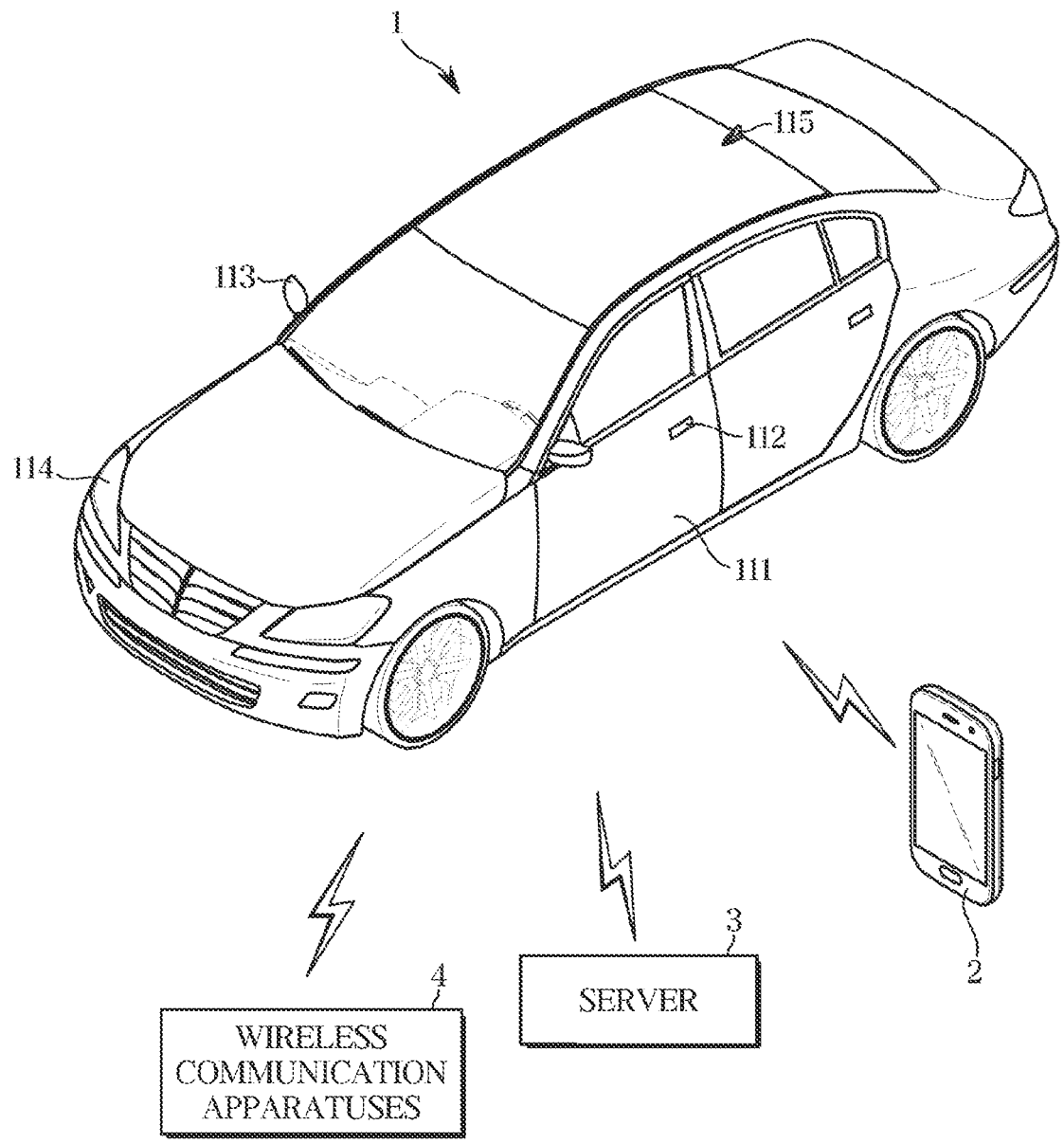
FIG. 1 is a view illustrating a communication of the vehicle according to an embodiment of the disclosure.

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software and/or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

FIG. 1 is a view illustrating a communication of the vehicle according to an embodiment of the disclosure.

The vehicle 1 may perform communication with a mobile device 2 and a server 3, and may perform communication with one or more wireless communication apparatuses 4, for example.

The exterior of the vehicle 1 includes a front panel, a bonnet, a roof panel, a rear panel, a trunk in which luggage may be disposed, front, rear, left, and right doors 111, and a window glass provided at each of the front, rear, left, and right doors to be openable and closable.

The doors 111 at the front, rear, left, and right sides of the vehicle 1 may have a handle 112 that may be gripped by a user to open and close the door. The handle 112 may have a shape that protrudes outward from the surface of the door 111. In addition, the handle 112 may be provided to be pulled into or out of the door 111.

An operating member (not shown) may be provided on the handle 112 to receive locking and unlocking commands from a user. The operating member of the handle 112 may be provided in various types such as a switch type, a button type, a touch type, and a lever type.

The vehicle may further include a locking member (127 in FIG. 2) for locking and unlocking the door 111 and an opening/closing member for opening and closing the door 111.

The locking member and the opening/closing member may allow the door to be connected to or separated from the body of the vehicle, and may allow the door to be locked or unlocked from the body of the vehicle.

The locking member and the opening/closing member may be implemented as one assembly.

The locking member and the opening/closing member may be implemented as different assemblies.

The locking member and the opening/closing member may be operated by manipulating the handle 112.

The exterior of the body includes a side mirror 113 providing the user (e.g., the driver) with a view of the rear of the vehicle 1 and a plurality of lamps 114 allowing the user to easily view information around the vehicle while observing the front view.

The side mirror 113 may perform an unfolding or folding operation in response to the starting on/off operation. The plurality of lamps 114 may perform not only lighting functions, but also signal functions and communication functions for other vehicles and pedestrians.

The vehicle 1 may further include an antenna 115 for communicating with the mobile device 2 and the server 3.

The antenna 115 may be provided on the roof panel, may be provided on a rear windshield glass, may be provided on the door 111, and may be provided on one of the front panel and the rear panel.

The interior of the body includes a seat on which an occupant sits, and a cluster (an instrument panel) located on a dashboard and providing guidance on driving functions and vehicle information, such as vehicle speed, engine revolution per minute (RPM), fuel amount, coolant, and the like, and a center fascia having a throttle of an air conditioner.

The seat is a chair on which the occupant may sit, and may include a driver's seat on which a driver may sit, a passenger seat provided next to the driver's seat and on which a passenger may sit, and a rear seat provided in the rear of the driver's seat and the passenger seat and on which a passenger may sit.

The vehicle 1 may further include an audio device, an air conditioner, a seat heating wire, a seat ventilation device, and a steering wheel heating wire for user convenience.

When the communication connection with the mobile device 2 is completed, the vehicle 1 may transmit and receive information with the mobile device 2.

The interior of the body may further include a start button for receiving an on/off command of the vehicle, a starting device (see 126 in FIG. 2) that controls starting in response to on/off of the start button.

If the vehicle is an eco-friendly vehicle, a button for receiving the on/off command of the vehicle is referred to as a boot button.

If the vehicle is an engine vehicle, the starting device of the vehicle may include a starting motor and an engine.

If the vehicle is an electric vehicle, the starting device of the vehicle may include a driving motor.

After the communication connection with the mobile device 2 is completed, the vehicle may operate the starting device based on information transmitted from the mobile device 2.

After the communication connection with the mobile device 2 is completed, the vehicle 1 controls unfolding of the side mirror 113 based on information transmitted from the mobile device 2 or controls a lighting or a blinking of at least one of the plurality of lamps 114.

After the communication connection with the mobile device 2 is completed, the vehicle 1 may adjust a position of the seat based on the information transmitted from the mobile device 2, or may adjust an operation of at least one of the air conditioner, the seat heating wire, the seat ventilator, and the steering wheel heating wire, for example.

The vehicle 1 includes a first communication device (see 123 in FIG. 2) for communicating with at least one of the mobile device 2, the server 3, and one or more wireless communication apparatuses 4, which are external devices.

The first communication device (see 123 of FIG. 2) may include one or more components that enable communication between vehicle internal components, and may include, for example, at least one of a short-range communication module, a wired communication module, and a wireless communication module.

The short-range communication module may include various short-range communication modules configured to transmit and receive signals using a wireless communication network in a short range, such as a Bluetooth module, an infrared communication module, a radio frequency identification (RFID) communication module, a wireless local access network (WLAN) communication module, a near field communication (NFC) module, and/or a Zigbee communication module. The wired communication module may include various wired communication modules, such as a controller area network (CAN) communication module, a local area network (LAN) module, a wide area network (WAN) module, or a value added network (VAN) communication module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module, for example.

The wired communication module may further include local interconnect network (LIN). The wireless communication module may include wireless communication modules supporting various wireless communication methods, such as a WiFi module, a wireless broadband module (Wibro) module, a global system for mobile (GSM) communication module, a code division multiple access (CDMA) module, a wideband code division multiple access (WCDMA) module, a universal mobile telecommunications system (UMTS) module, a time division multiple access (TDMA) module, a long term evolution (LTE) module, and the like, for example.

The mobile device 2 may perform communication with at least one of the vehicle 1, the server 3, and one or more wireless communication apparatuses 4.

The mobile device 2 may be a mobile device possessed by the user who has an authorization control the vehicle 1.

The mobile device 2 may download and set up an application for controlling the vehicle 1 and execute the application.

The application may be an application for using a remote service of the vehicle 1.

The mobile device 2 may display an image corresponding to the execution of the application.

The mobile device 2 may proceed with membership registration when the application is initially executed, and may transmit user registration information corresponding to membership registration and identification information of the mobile device to the vehicle 1 or the server 3.

The mobile device 2 may generate and store a digital key for controlling the vehicle 1 in response to user registration of the application, and may transmit the digital key to the vehicle 1 or the server 3. In this case, the vehicle 1 and the server 3 may store the user registration information, the identification information of the mobile device 2, and the digital key as information for controlling the vehicle 1.

The mobile device 2 may perform user authentication when executing the application to control the vehicle.

The mobile device 2 may receive a user input when the application is executed.

The user input may include a locking and unlocking command for the door 111, a locking and unlocking command for the tailgate, an on command of the vehicle 1, a lighting command of the lamps 114, an operation command for the seat heating wire, and an operation command for the seat ventilation device, an operation command for the air conditioner, a an operation command for the steering wheel heating wire, and/or an operation command for the audio device, for example.

The mobile device 2 may transmit information corresponding to a command received by the user input to the vehicle 1. The mobile device 2 may transmit information corresponding to the received command to the vehicle 1 as a communication signal.

The mobile device 2 may be implemented as a computer or portable terminal capable of accessing the vehicle via a network.

Herein, the computer may include, for example, a laptop equipped with a web browser, a desktop, a tablet Personal Computer (PC), and a slate PC, and the like. In addition, the portable terminal, for example, a wireless communication device that ensures portability and mobility, and may include all types of handheld-based wireless communication device such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, and smart phone, and the like, and wearable devices such as watches, rings, bracelets, anklets, necklaces, glasses, contact lenses, or head-mounted-device (HMD), for example.

The mobile device 2 of an embodiment may communicate with the vehicle through a Bluetooth Low Energy (BLE) communication method. The mobile device 2 may communicate by the Bluetooth beacon standard (iBeacon).

The server 3 may perform communication with the vehicle 1 and the mobile device 2.

The server 3 may receive and store identification information of the vehicle 1 and the user registration information of the vehicle, and store the identification information of the mobile device 2.

The server 3 may receive information of the mobile device 2 by linking with the mobile device 2.

The user registration information may include identification information of the user registered in the server 3, biometric information of the user registered in the server 3, or the identification information of the mobile device 2 possessed by the user registered in the server 3, for example.

The user registration information may include a name of the user registered in the server 3, a home address of the user, an e-mail address of the user, a resident registration number of the user, date of birth, and/or driver's license information of the user, for example.

The identification information of the user registered in the server 3 or the identification information of the mobile device 2 may be information registered through an application (app) installed in the vehicle or mobile device 2.

The identification information of the mobile device 2 may be unique identification information of the mobile device 2 that is distinguished from other mobile devices, and includes at least one of phone number of the mobile device 2, Wi-Fi MAC address of the mobile device 2, serial number of the mobile device 2, and/or international mobile equipment identity code (IMEI) of the mobile device 2, for example.

The identification information of the mobile device 2 may include Bluetooth identification information (BTID).

The identification information of the vehicle may include vehicle model, vehicle type, license plate information, power generation method (e.g., hybrid, electric, internal combustion engine, hydrogen, etc.), shift method, and the like, for example.

The server 3 may provide the remote service between the mobile device 2 and the vehicle 1.

The remote service may provide information received through the server 3 to the user through the vehicle 1, or may provide the user input received in the vehicle 1 and operation information of the vehicle 1 to the mobile device 2, or may control the vehicle 1 based on the user input received through the mobile device 2, for example.

That is, the server 3 may allow the user to control the operation of at least one electronic device provided in the vehicle 1 through the mobile device 2 based on information on the digital key received through the mobile device 2.

The server 3 may be a server provided in a service center, a manufacturing company, or a maintenance center that manages the vehicle 1, for example. Also, the server 3 may be an application (i.e., app) server that provides a service associated with the vehicle 1, and may be a telematics server or a platform server.

One or more wireless communication apparatuses 4 may be provided in buildings, infrastructures, outdoor public places, and the like, for example.

One or more wireless communication apparatuses 4 may be provided in other mobile devices, other vehicles, personal mobility devices, and motorcycles. That is, one or more wireless communication apparatuses 4 may be provided in a movable device.

One or more wireless communication apparatuses 4 may perform wireless communication with the vehicle 1 and the mobile device 2.

One or more wireless communication apparatus 4 may include a short-distance communication module and a wireless communication module.

The short-range communication module may include various short-range communication modules configured to transmit and receive signals using a wireless communication network in a short range, such as a Bluetooth module, an infrared communication module, a radio frequency identification (RFID) communication module, a wireless local access network (WLAN) communication module, a near field communication (NFC) module, and/or a Zigbee communication module, for example.

The wired communication module may further include local interconnect network (LIN). The wireless communication module may include wireless communication modules supporting various wireless communication methods, such as a WiFi module, a wireless broadband module (Wibro) module, a global system for mobile (GSM) communication module, a code division multiple access (CDMA) module, a wideband code division multiple access (WCDMA) module, a universal mobile telecommunications system (UMTS) module, a time division multiple access (TDMA) module, a long term evolution (LTE) module, and the like, for example.

One or more wireless communication apparatuses 4 may periodically transmit wireless signals for wireless communication or receive signals transmitted from the vehicle 1 or the mobile device 2.

Each of one or more wireless communication apparatuses 4 may store identification information of the wireless communication apparatus.

The two or more wireless communication apparatuses 4 may include a first type of wireless communication apparatus to perform communication in the same communication method as the first communication module 123a of the vehicle 1, and a second type of wireless communication apparatus to perform communication in the same communication method as the second communication module 123b of the vehicle 1, for example.

The second type of wireless communication apparatus may have a position information set.

Figure 2:
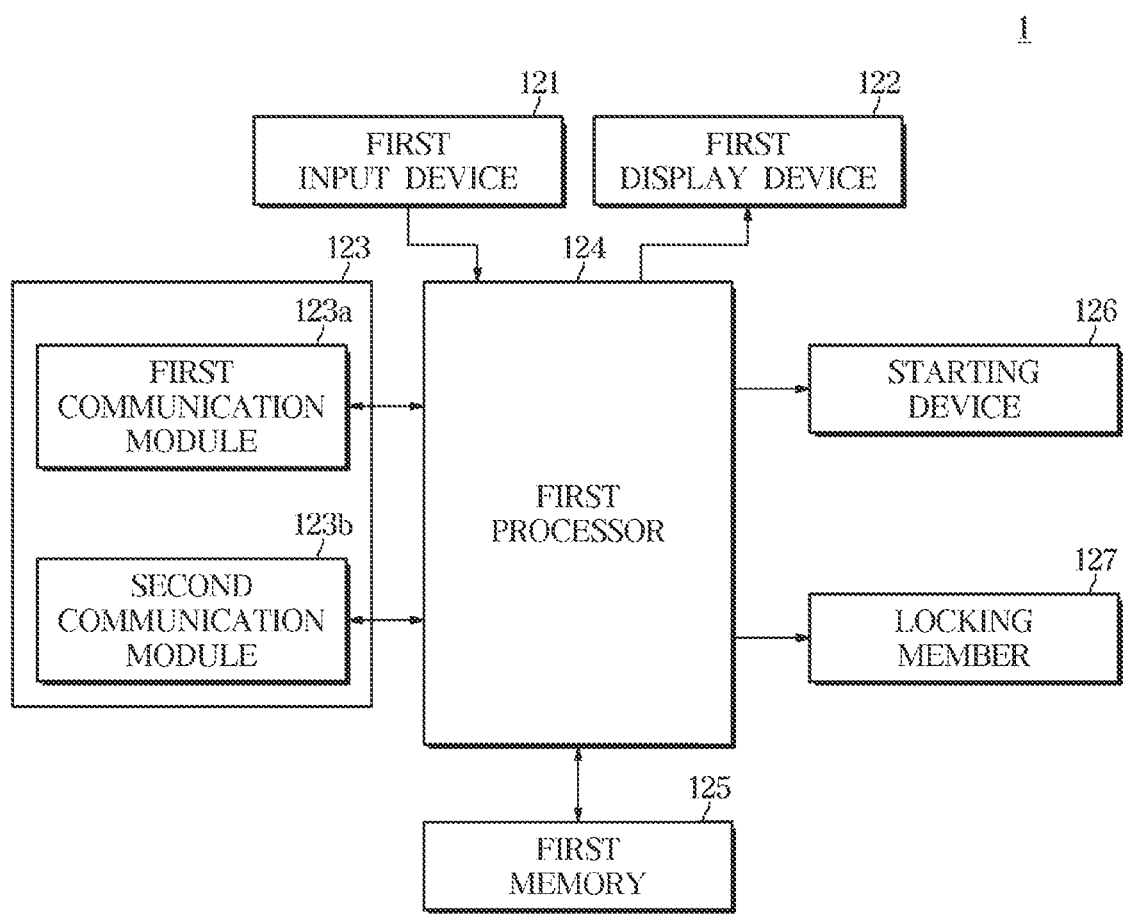
FIG. 2 is a view illustrating a control block diagram of a vehicle according to an embodiment of the disclosure.

FIG. 2 is a view illustrating a control block diagram of a vehicle according to an embodiment of the disclosure, and will be described with reference to FIGS. 2 to 8.

In order to distinguish between components of the vehicle 1 and components of the mobile device 2 with the same component name, 'first' is written in the components of the vehicle and 'second' is written in the components of the mobile device.

The vehicle 1 of an embodiment includes a first input device 121, a first display device 122, a first communication device 123, a first processor 124, a first memory 125, a starting device 126, and a locking member 127.

The first input device 121 may receive a user input.

The first input device 121 may receive operation commands for various functions that may be performed in the vehicle 1 as the user input.

The first input device 121 may receive an acceleration command, a deceleration command, a steering command, and the like for driving control of the vehicle 1.

The first input device 121 may receive a command to open and close the door 111, a command to lock and unlock the door 111, a command to on and off of the vehicle, an operation command of a seat ventilation device, and an operation command of a seat heating wire, a command, an operation command of a steering wheel heating wire, an operation command for an air conditioner, and/or an operation command for an audio device, for example.

The first input device 121 may receive a registration command of the mobile device 2 for remotely controlling the vehicle.

The first input device 121 may receive identification information of the mobile device 2, and may receive authentication information for registration of the mobile device 2.

The authentication information for registration of the mobile device 2 may include authentication information transmitted to the mobile device 2 from the vehicle 1. In an embodiment, the mobile device 2 registered in the vehicle 1 may perform a function of a digital key of the vehicle.

The first input device 121 may receive identification information of the user. The identification information of the user may be user registration information for controlling a vehicle 1.

The first input device 121 may receive a command to generate a constellation map. In an embodiment, the constellation map is a position map of wireless communication apparatuses around the vehicle, and may be a map marked with a relative position with the vehicle 1.

The first display device 122 may display information on functions being performed in the vehicle and information input by the user.

The first display device 122 may display information about a registration process of the mobile device 2 as an image, and may display registration success information or registration failure information of the mobile device 2 as an image in response to the registration result.

The first display device 122 may also display identification information of the mobile device 2 that has been registered.

The first display device 122 may display information about an authentication process with the mobile device 2 when communication with the mobile device 2 is attempted, and may provide an authentication success or an authentication failure information of the mobile device 2 corresponding to an authentication result.

The first display device 122 may also display the identification information of the mobile device 2 that has succeeded in authentication.

The first display device 122 may display information on successful generation of a constellation map.

In an embodiment, the first input device 121 and the first display device 122 may be implemented as a touch screen. Also, the first input device 121 and the first display device 122 may be provided as an input device and a display device of an audio video navigation (AVN) device.

The first communication device 123 may include one or more components that enable communication between vehicle internal components. The first communication device 123 may include one or more components that enable communication between the vehicle and an external device, and may include, for example, at least one of a short-range communication module, a wired communication module, and a wireless communication module.

The external device may be the mobile device 2, the server 3, and one or more wireless communication apparatuses 4.

The first communication device 123 may transmit information received from the external device to the first processor 124 and may transmit information corresponding to a control command of the first processor 124 to the external device.

The first communication device 123 may include first and second communication modules that perform communication using different communication methods.

The first communication module 123a communicates with the mobile device 2 and communicates with one or more wireless communication apparatuses 4 around the vehicle.

The first communication module 123a may perform communication with a wireless communication apparatus that does not transmit position information among one or more wireless communication apparatuses 4. For example, the first communication module 123a may be a Bluetooth module.

A wireless communication apparatus 4 that does not transmit the position information may be a first type of wireless communication apparatus that performs communication of the same communication method as the first communication module 123a.

The first communication module 123a may be configured to communicate with the mobile device 2 and perform Bluetooth communication with the mobile device that performs a function of a digital key. The first communication module 123a may perform Bluetooth communication with one or more wireless communication apparatuses 4 around the vehicle.

In particular, the performing of the Bluetooth communication may include communicating with the mobile device 2 and one or more wireless communication apparatuses 4 using at least one of a broadcasting method and a connection method.

The broadcasting method may be a communication method in which a communication connection is not established with the mobile device 2 and one or more wireless communication apparatuses 4. The broadcasting method may be a communication method that periodically transmits an advertising signal notifying the existence of the vehicle 1 to the mobile device 2 and the wireless communication apparatuses 4 around the vehicle. During this process, the vehicle 1 may transmit identification information of the vehicle.

The advertising signal may be a scan signal.

In the broadcasting method, an amount of data to be transmitted may be less than or equal to preset bytes. In other words, the broadcasting method may be used when a small amount of data is periodically transmitted to a plurality of mobile devices.

A connection method may be used to perform two-way transmission or to transmit an amount of data that exceeds preset bytes. In a connection method, data may be transmitted after the vehicle 1 and the mobile device 2 are connected in one-to-one method, and the security is ensured as compared to the broadcasting method. In particular, the information transmitted from the mobile device 2 may include command information for operating at least one of a plurality of loads provided in the vehicle 1.

The mobile device 2 may transmit the advertising signal to inform the presence of the mobile device.

One or more wireless communication apparatuses 4 may transmit the advertising signal to inform the presence of one or more wireless communication apparatuses 4.

The first communication module 123a may transmit a beacon packet to the mobile device 2 in response to the control command of the first processor 124 and may transmit the beacon packet to the mobile device 2 as an advertising signal.

After a response signal is received from the mobile device 2 and one or more wireless communication apparatuses 4, the first communication module 123a may transmit the received response signal to the first processor 124.

The second communication module 123b may be a communication module that performs communication in a communication method different from that of the first communication module 123a. The second communication module 123b may perform communication with the server 3 and one or more wireless communication apparatuses 4 around the vehicle.

The second communication module 123b may perform communication with a second type of wireless communication apparatus that transmits position information among one or more wireless communication apparatuses 4. For example, the second communication module 123b may be at least one of a Long Term Evolution (LTE) and a WiFi module.

A wireless communication apparatus 4 that transmits the position information may be the second type of wireless communication apparatus that performs communication in the same communication method as the second communication module 123b.

The second communication module 123b may transmit a scan signal for scanning one or more wireless communication apparatuses 4 located around the vehicle in response to the control command of the first processor 124.

After a response signal is received from the mobile device 2 and one or more wireless communication apparatuses 4, the second communication module 123b may transmit the received response signal to the first processor 124.

The first communication module 123a and the second communication module 123b may have the same or different communication range.

When the first communication module 123a and the second communication module 123b have different communication range, the second communication module 123b may have a greater communication range than the first communication module 123a, for example.

After a registration command for registering the mobile device 2 is received by the first input device 121, the first processor 124 may retrieve for a communicable mobile device 2 and transmit authentication information for authentication to the retrieved mobile device (2).

After the authentication information is received by the first input device 121, the first processor 124 may compare the received authentication information with the transmitted authentication information, and when the received authentication information and the transmitted authentication information are the same, may register the retrieved mobile device 2 as a mobile device 2 for performing the function of the digital key.

The first processor 124 may control the first memory 125 to store the identification information of the retrieved mobile device 2 in the first memory 125, and may control the first display device to display the identification information of the registered mobile device 2.

The first processor 124 may control the first memory 125 to store the identification information of the mobile device 2 received through the server 3 in the first memory 125, and may control the first display device 122 to display the identification information of the mobile device 2 received through the server 3. That is, the first processor 124 may receive the identification information of the mobile device 2 for performing the function of the digital key from the server 3.

The first processor 124 may transmit a beacon packet for authentication of the mobile device 2 and communication connection with the mobile device 2 to the mobile device 2, for registering the mobile device to perform the function of the digital key.

Figure 3:
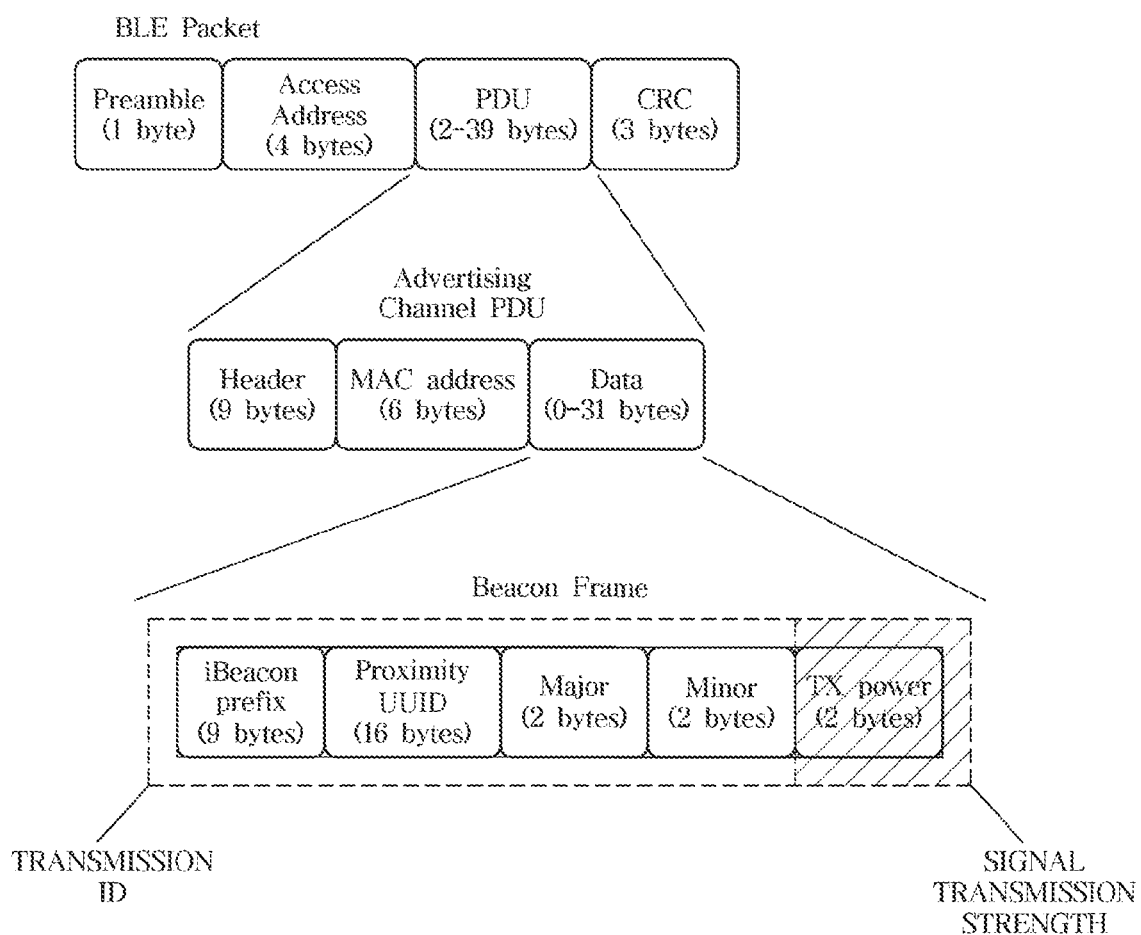
FIG. 3 is a view illustrating a structure of a beacon packet of a vehicle according to an embodiment of the disclosure.

Referring to FIG. 3, as an example, the Bluetooth packet (also known as the beacon packet) may include a preamble field for synchronizing transmission timing between two or more devices, an access address field having an address for communication connection in a link layer, a protocol data unit (PDU) field having information regarding the total amount of data transmitted and received with the same communication layers, and a cyclic redundancy identify (CRC) field including a method of determining a identify value for identifying an existence of an error in data transmitted during data transmission. The following description will be made in relation to an advertising data standard for broadcasting according to the iBeacon specification as an example.

The PDU field is an advertising channel protocol data unit field, and may include a header field included before a data set and identifying and controlling data to ensure that content and characteristics of the data are identified, a Mac Address field including a unique number existing in a device used in a network, such as a LAN card, a modem, a terminal, a mobile device and the like, and a data field. The data field may include a prefix (iBeacon prefix), a universal unique identification number (Proximity Universal Unique (UUID)) field, a major field, a minor field, and a transmit (TX) power field.

In particular, the prefix (iBeacon prefix) field is a portion in which a setting or characteristic value of a beacon is recorded, and may include an advertising flag, an advertising header, company identification (ID) information, and a beacon length (Length). The prefix (iBeacon prefix) field is a field that indicates whether the vehicle is a vehicle using a beacon protocol. The universal unique identification number (UUID) field contains a unique identification (ID) information of a device or a product. The universal unique identification number (Proximity UUID) field is a field used to prove identification information of a vehicle, together with a company name of the vehicle.

The major field may include identification information (ID) of a service group or region. For example, the major field is a field used to identify a broad position where the vehicle is used. Identification (ID) information of the minor field may include information for identifying nodes within the same region. For example, the minor field is a field used to identify a narrow position where the vehicle is used and an individual vehicle. The TX Power field may include a power level of a signal transmitted from the vehicle.

Accordingly, when the mobile device 2 receives the beacon signal, the mobile device may be configured to identify the signal strength. In other words, the mobile device 2 may be configured to compare the transmission signal strength that corresponds to the power level with a received signal strength, to obtain the amount of decrease of strength and obtain the distance to the vehicle 1 based on the amount of the decrease.

When the vehicle 1 also receives a signal from the mobile device 2, the vehicle may obtain the received signal strength, and may obtain distance information with the mobile device 2 based on the received signal strength.

Figure 4:
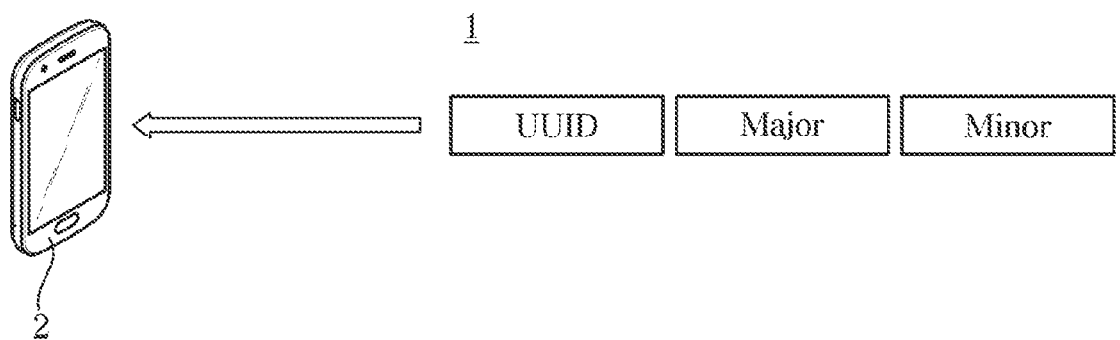
FIG. 4 is a view illustrating a data field transmitted from a vehicle to a mobile device according to an embodiment of the disclosure.

Referring to FIG. 4, the first processor 124, in response to completion of the registration of the mobile device 2, may be configured to transmit information regarding a proximity UUID field, a major field, and a minor field of data included in a beacon packet to the mobile device 2 as information for communication connection with the mobile device 2 for which registration is completed. When the first processor 124 attempts to communicate with the mobile device 2 for performing a key of a digital key, the first processor 124 may be configured to transmit a beacon packet.

When the first processor 124 attempts to communicate with the mobile device 2, the first processor 124 may be configured to periodically transmit an advertising (ADV) signal in a broadcasting manner using the first communication module 123a, for example.

At this time, the advertising signal transmitted from the vehicle 1 may be received by one or more wireless communication apparatuses 4 in addition to the mobile device 2.

The mobile device 2 and one or more wireless communication apparatuses 4 may receive the advertising signal transmitted from the vehicle 1, and transmit a response signal of the broadcasting method of the Bluetooth corresponding to the advertising signal to the vehicle 1.

The first processor 124 may obtain a received signal strength based on the received response signal.

More specifically, when the response signal of the broadcasting method is received, the first processor 124 may determine whether the received response signal of the broadcasting method and the advertising signal of the broadcasting method transmitted from the vehicle are the same, and when it is determined that the received response signal of the broadcasting method and the advertising signal of the broadcasting method transmitted from the vehicle are the same, may obtain the received signal strength.

The first processor 124 may determine whether the vehicle is parked or stopped.

The first processor 124 may determine that the vehicle is parked or stopped when a driving speed of the vehicle is equal to or less than a reference speed.

The first processor 124 may determine that the vehicle is parked or stopped when a position of a shift lever is at a parking position P or an electronic parking brake switch is engaged.

The first processor 124 may determine that the vehicle is parked or stopped when it is determined that a current position is a destination based on current position information of the vehicle and destination information.

The first processor 124 may determine that the vehicle is parked or stopped when it is determined that the current position is a parking lot based on the current position information.

When receiving an off command of the vehicle, the first processor 124 may determine that the vehicle is parked or stopped.

Figure 5:
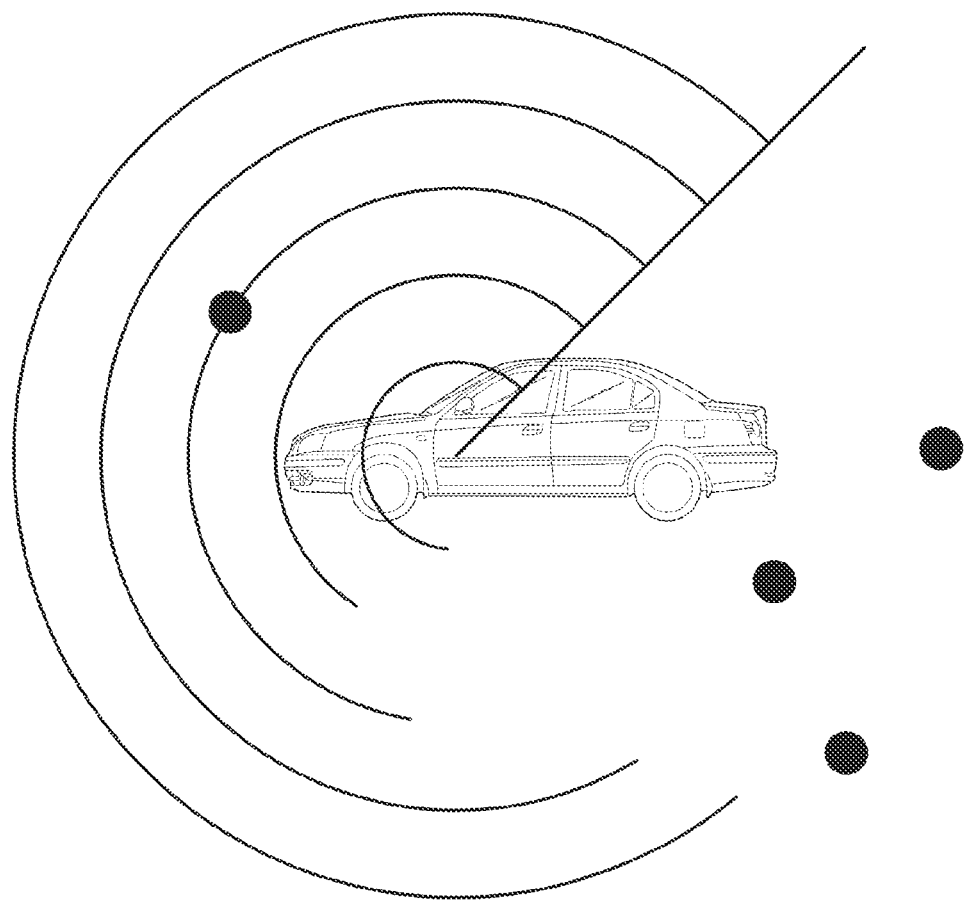
FIG. 5 is a view illustrating a scanning operation of a vehicle according to an embodiment of the disclosure.

As shown in FIG. 5, the first processor 124 may control the first communication device 123 when it is determined that the vehicle is parked or stopped to scan the wireless communication apparatuses 4 existing around the vehicle.

At this time, because the mobile device 2 also has a communication device capable of wireless communication, the mobile device may also be scanned.

After response signals are received from each of the wireless communication apparatuses 4, the first processor 124 may identify the received signal strength of the received response signal of each of the wireless communication apparatuses 4, and may obtain distance information of each of the wireless communication apparatuses 4 based on the identified received signal strength of each of the wireless communication apparatuses 4. The Distance information of each of wireless communication apparatuses may be relative distance information with the vehicle 1.

After the response signal is received from each of the wireless communication apparatuses 4, the first processor 124 may identify the identification information of each of the wireless communication apparatuses 4 from the received response signal.

The first processor 124 may classify a plurality of wireless communication apparatuses that transmit response signals based on the identification information of the wireless communication apparatuses 4 into a first type of wireless communication apparatus and a second type of wireless communication apparatus.

In this case, for example, after the response signal is received from each of the wireless communication apparatuses 4, the first processor 124 may classify the received response signal of each of the wireless communication apparatuses 4 into a first response signal without position information and a second response signal including position information.

The first processor 124 may identify the received signal strength of the first response signal and may obtain distance information of the wireless communication apparatuses 4 that have transmitted the first response signal based on the identified received signal strength.

The first processor 124 may identify the received signal strength and position information of the second response signal, may obtain distance information of the wireless communication apparatuses 4 that transmitted the second response signal based on the identified received signal strength, may obtain direction information of the wireless communication apparatuses 4 that have transmitted the second response signal based on the identified position information, and may obtain relative position information of the wireless communication apparatuses 4 that have transmitted the second response signal based on the obtained distance information and direction information.

The first processor 124 may determine the wireless communication apparatus transmitting the first response signal received in the first communication module 123*a* as the first type of wireless communication apparatus, and may determine the wireless communication apparatus transmitting the second response signal received in the second communication module 123*a* as the second type of wireless communication apparatus.

The first processor 124 may obtain the distance information with the first type of wireless communication apparatus that transmitted the received first response signal based on the received signal strength of the first response signal received by the first communication module 123*a*.

The first processor 124 may identify the received signal strength and the position information of the second response signal received through the second communication module 123*b*, may obtain the distance information of the second type of wireless communication apparatuses 4 transmitting the second response signal based on the identified received signal strength, may obtain the direction information of the second type of wireless communication apparatuses 4 transmitting the second response signal based on the identified position information, and may obtain the relative position information of the second type of wireless communication apparatuses 4 based on the obtained distance information and direction information.

The first processor 124 may identify the first type of wireless communication apparatuses having a fixed position based on the identification information of each of the first type of wireless communication apparatuses, and may obtain the relative distance information of each of the first type of wireless communication apparatuses having the fixed position. The first processor 124 may identify the first type of wireless communication apparatuses to be moved based on the identification information of each of the first type of wireless communication apparatuses, may exclude the first type of wireless communication apparatuses to be moved from the constellation map, and may generate the constellation map using the relative distance information of each of the first type of wireless communication apparatuses having the fixed position.

The first processor 124 may exclude first type of wireless communication apparatuses to be moved from the wireless communication apparatuses to be recorded in the constellation map.

For example, in response to the recognition of a Bluetooth speaker provided in a large concert hall based on the identification information of the first type of wireless communication apparatus, the first processor 124 may identify the Bluetooth speaker as the first type of wireless communication apparatus having the fixed position, and may obtain the distance information with the Bluetooth speaker based on the received signal strength of the Bluetooth speaker.

As another example, in response to the recognition of a Bluetooth lighting device provided in a building based on the identification information of the first type of wireless communication apparatus, the first processor 124 may identify the Bluetooth lighting device as the first type of wireless communication apparatus having the fixed position, and may obtain the distance information with the Bluetooth lighting device based on the received signal strength of the Bluetooth lighting device.

As another example, in response to the recognition of a mobile device of the other user based on the identification information of the first type of wireless communication apparatus, the first processor 124 may identify the mobile device of the other user as the first type of wireless communication apparatus to be moved, and may exclude the mobile device of the other user among the first type of wireless communication apparatuses.

That is, the first processor 124 may exclude mobile devices of other users from the wireless communication apparatuses to be recorded in the constellation map.

The first processor 124 may identify the received signal strength of each of the first type of wireless communication apparatuses, and may compare a reference received signal strength and the received signal strength of each of the first type of wireless communication apparatuses. The first processor 124 may identify the first type of wireless communication apparatuses in which the received signal strength of the first type of wireless communication apparatus is less than the reference received signal strength among the first type of wireless communication apparatuses, and may exclude the identified first type of wireless communication apparatuses from the wireless communication apparatuses to be recorded in the constellation map.

The first processor 124 may identify the second type of wireless communication apparatuses having a fixed position based on the identification information of each of the second type of wireless communication apparatuses, and may obtain the relative distance information of each of the second type of wireless communication apparatuses having the fixed position. The first processor 124 may identify the second type of wireless communication apparatuses to be moved based on the identification information of each of the second type of wireless communication apparatuses, and may exclude the second type of wireless communication apparatuses to be moved from the constellation map, and may generate the constellation map using the relative distance information of each of the second type of wireless communication apparatuses having the fixed position.

For example, in response to the recognition of a wireless access point (AP) provided in a building based on the identification information of the second type of wireless communication apparatus, the first processor 124 may identify the wireless access point (AP) as the second type of wireless communication apparatus having the fixed position, may obtain the distance information with the wireless access point (AP) based on the received signal strength of the wireless access point (AP), may obtain the direction information with the wireless access point (AP) based on the position information of the wireless access point (AP), and may obtain the relative position information with the wireless access point (AP) based on the obtained distance information and the obtained direction information.

As another example, in response to the recognition of a Cell Tower based on the identification information of the second type of wireless communication apparatus, the first processor 124 may identify the Cell Tower as the second type of wireless communication apparatus having the fixed position, may obtain the distance information with the Cell Tower based on the received signal strength of the Cell Tower, may obtain the direction information with the Cell Tower based on the position information of Cell Tower, and may obtain the relative position information with the Cell Tower based on the obtained distance information and the obtained direction information.

As another example, in response to the recognition of a portable router (e.g., an egg, a portable Wi-Fi device) based on the identification information of the second type of wireless communication apparatus, the first processor 124 may identify the portable router as the second type of wireless communication apparatus to be moved, and may exclude the portable router among the second type of wireless communication apparatuses.

That is, the first processor 124 may exclude the portable router from wireless communication apparatuses to be recorded in the constellation map.

The first processor 124 may identify the received signal strength of each of the second type of wireless communication apparatuses, and may compare a reference received signal strength and the received signal strength of each of the second type of wireless communication apparatuses. The first processor 124 may identify the second type of wireless communication apparatuses in which the received signal strength of the second type of wireless communication apparatus is less than the reference received signal strength among the second type of wireless communication apparatuses, and may exclude the identified second type of wireless communication apparatuses from the wireless communication apparatuses to be recorded in the constellation map.

The first processor 124 may select the second type of wireless communication apparatuses having fixed position among the second type of wireless communication apparatuses that have transmitted the second response signal, and may record the constellations of the selected second type of wireless communication apparatuses based on the relative position information of the selected second type of wireless communication apparatuses.

Figure 6A:
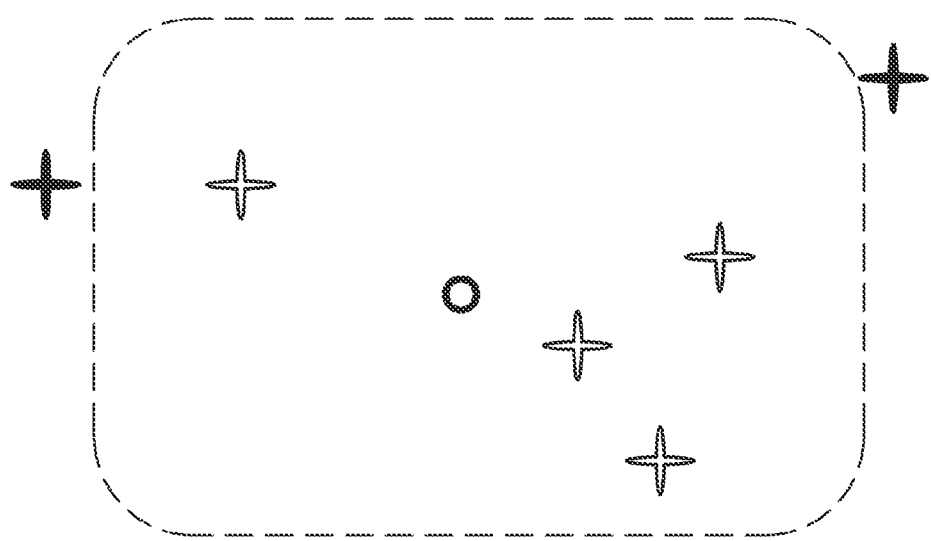
FIG. 6A and FIG. 6B are views illustrating a generation of a constellation map and a print pattern of a constellation map of wireless communication apparatuses of a second type of a vehicle according to an embodiment of the disclosure.

As shown in FIG. 6A, for example, the first processor 124 may generate a constellation map by recording the relative positions of the selected second type of wireless communication apparatuses as constellations (*) based on the position (o) of the vehicle on a one-dimensional plane.

Figure 6B:
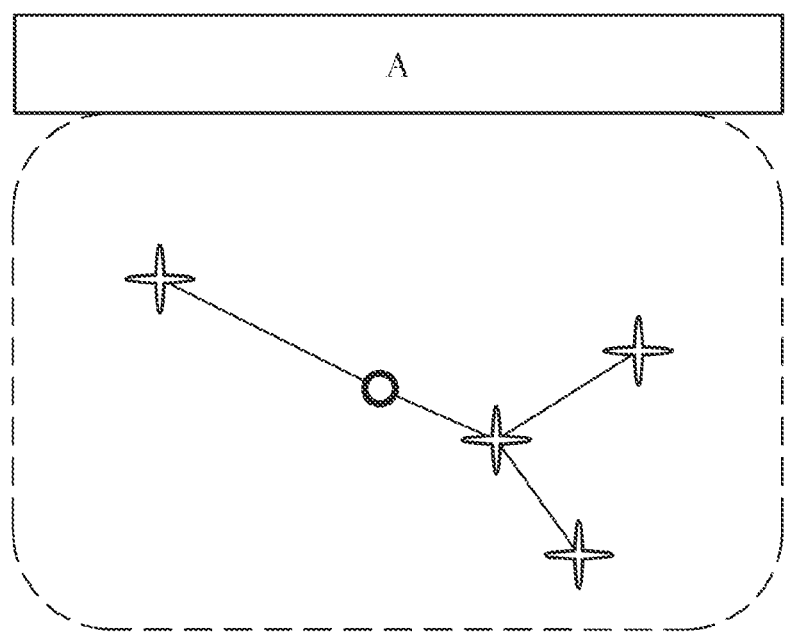

As shown in FIG. 6B, for example, the first processor 124 may connect stars adjacent to the vehicle to the vehicle in a straight line based on the position (o) of the vehicle on the one-dimensional plane, and may generate a print pattern of the constellation map by connecting adjacent stars among stars not adjacent to the vehicle in the straight line.

The print pattern of the constellation map may be generated in the server 3 and stored in the server 3, for example.

The first processor 124 may select the first type of wireless communication apparatuses having fixed position among the first type of wireless communication apparatuses that have transmitted the first response signal, and may generate a constellation map by recording the constellations of the selected first type of wireless communication apparatuses based on the relative distance information of the selected first type of wireless communication apparatuses.

Figure 7:
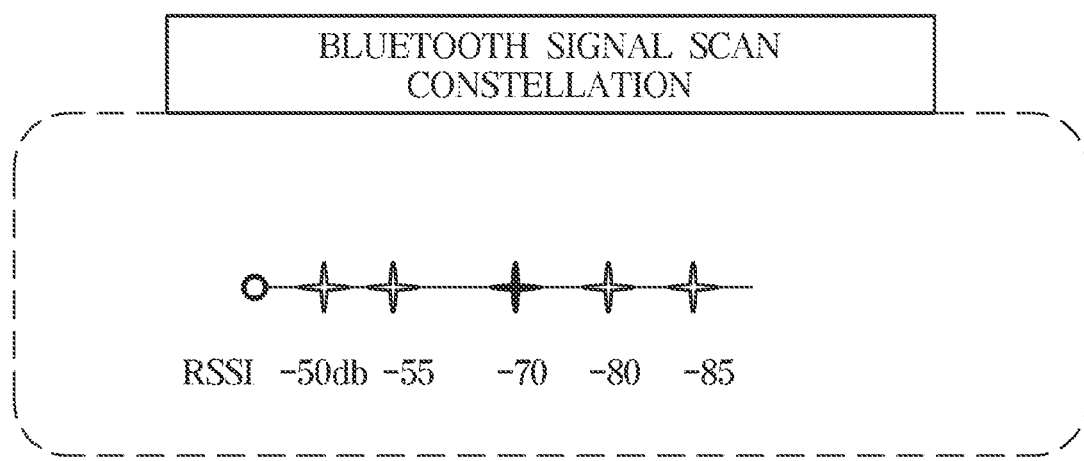
FIG. 7 is a view illustrating a generation of a print pattern of a constellation map of wireless communication apparatuses of a first type of a vehicle according to an embodiment of the disclosure.

As shown in FIG. 7, for example, the first processor 124 may record the relative distance of the selected first type of wireless communication apparatuses on the same straight line as the position of the vehicle based on the position (o) of the vehicle on the one-dimensional plane by the constellation (*), and may generate the constellations recorded on the straight line as a constellation map.

The first processor 124 may generate the print pattern of a constellation map by connecting the constellation maps on the one-dimensional plane with the straight line.

The first processor 124 may select the first and second types of wireless communication apparatuses having fixed position among the wireless communication apparatuses that transmit the first and second response signals, may record the constellation on the same line as the vehicle based on the position of the vehicle based on the distance information of the selected first type of wireless communication apparatuses, may generate a constellation map by recording the constellation based on the position of the vehicle based on the relative position information of the selected second type of wireless communication apparatuses, and may generate a print pattern corresponding to the constellation map.

The relative position information may include relative distance information and relative direction information.

When the vehicle is parked or stopped, the first processor 124 may store the initially generated constellation map as a first reference constellation map, and may store the print pattern corresponding to the initially generated constellation map as a first reference print pattern (A) corresponding to the first reference constellation map.

The first processor 124 may store the generated first reference constellation map in the first memory 125, and may transmit the generated first reference constellation map to the server 3.

The first processor 124 may transmit the first reference constellation map, the identification information of the vehicle, and current position information to the server 3 together.

The first processor 124 may store the first reference print pattern corresponding to the first reference constellation map in the first memory 125 and transmit the first reference print pattern to the server 3.

The first processor 124 may transmit the first reference print pattern corresponding to the first reference constellation map to a local device (not shown) performing a local constellation print pattern check.

When the mobile device 2 is scanned during the parking state or the stop state, the first processor 124 may compare the first reference print pattern corresponding to the first reference constellation map with the second reference print pattern corresponding to the second reference constellation map transmitted from the mobile device 2, when the first reference print pattern and the second reference print pattern are different, it may be determined that a relay attack is detected, and may deactivate the digital key, thereby blocking the transfer of the authorization control to control the vehicle using the digital key.

When it is determined that the relay attack is detected, the first processor 124 may transmit a relay attack detection event to the mobile device 2 through the server 3.

When the first reference print pattern (A) and the second reference print pattern (A') are the same, the first processor 124 may activate the digital key, and thereby transfer the authorization control to control the vehicle using the digital key to the mobile device 2.

The first processor 124 may periodically regenerate a constellation map or regenerate a print pattern corresponding to a constellation map during a parking or stopped state.

When the on command of the vehicle is received through the start button or the mobile device 2 during the parking state or the stop state, the first processor 124 may regenerate a constellation map, may compare the first reference constellation map with the regenerated constellation map, and when the constellation map and the regenerated constellation map are the same, may control the electronic devices provided in the vehicle to enable control of the vehicle, and when the constellation map and the regenerated constellation map are different, may control the electronic devices in the vehicle so that control of the vehicle is impossible.

Figure 8:
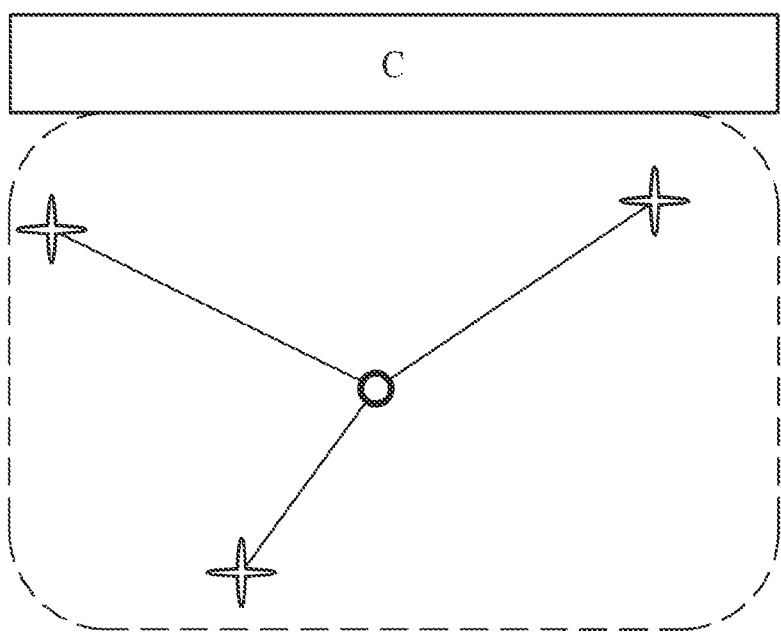
FIG. 8 is a view illustrating a generation of a regeneration of a print pattern of a constellation map of a second type of wireless communication apparatuses of a vehicle according to an embodiment of the disclosure.

As shown in FIG. 8, when the on command of the vehicle is received through the start button or the mobile device 2 during the parking state or the stop state, the first processor 124 may regenerate a print pattern (C) of the constellation map, may compare the first reference print pattern (A) and the regenerated print pattern corresponding to the regenerated constellation map, and when the first reference print pattern (A) and the regenerated print pattern (C) are the same, may control the electronic devices provided in the vehicle to enable control of the vehicle, and when the first reference print pattern (A) and the regenerated print pattern (C) are different, may control the electronic devices in the vehicle so that control of the vehicle is impossible.

When determining whether the first reference print pattern and the regenerated print pattern are the same, the first processor 124 may identify a matching rate of the first reference print pattern and the regenerated print pattern, and when the identified matching rate is greater than or equal to the reference matching rate, may determine that the first reference print pattern and the regenerated print pattern are the same, and when the identified matching rate is less than the reference matching rate, may determine that the first reference print pattern and the regenerated print pattern are different.

When the on command of the vehicle is received through the start button or the mobile device 2 during the parking state or the stop state, the first processor 124 may receive the first reference constellation map or the first reference print pattern corresponding to the first reference constellation map from the server 3.

The first processor 124 may also compare the first reference constellation map and a periodically generated constellation map.

When the advertising signal of the mobile device is received during the parking state or the stop state, the first processor 124 may regenerate the constellation map and the print pattern (C) corresponding to the constellation map.

When the on command of the vehicle is received through the start button or the mobile device 2 during the parking state or the stop state, the first processor 124 may regenerate the print pattern corresponding to the constellation map, and may compare the regenerated print pattern (C), the first reference print pattern (A) corresponding to the first reference constellation map, the regenerated print pattern (B) corresponding to the regenerated constellation map received by the mobile device, and the second reference print pattern (A') corresponding to the second reference constellation map received by the mobile device with each other.

When the regenerated print pattern (C) and the first reference print pattern (A) are the same, the first processor 124 may set the security level to a first level, and may control the electronic devices provided in the vehicle to enable control of the vehicle.

When the regenerated print pattern (B) and the second reference print pattern (A') are the same, the first processor 124 may set the security level to a second level, and may control the electronic devices provided in the vehicle to enable control of the vehicle.

When the regenerated print pattern (C) and the first reference print pattern (A) are the same and the regenerated print pattern (B) and the second reference print pattern (A') are the same, the first processor 124 may set the security level to a third level, and may control the electronic devices provided in the vehicle to enable control of the vehicle.

When the regenerated print pattern (C) and the first reference print pattern (A) are the same, the regenerated print pattern (B) and the second reference print pattern (A') are the same and the regenerated print pattern (B) and the regenerated print pattern (C) are the same, the first processor 124 may set the security level to a fourth level, and may control the electronic devices provided in the vehicle to enable control of the vehicle.

When the regenerated print pattern (C) and the first reference print pattern (A) are different, the regenerated print pattern (B) and the second reference print pattern (A') are different and the regenerated print pattern (B) and the regenerated print pattern (C) are different, the first processor 124 may control the electronic devices in the vehicle so that control of the vehicle is impossible.

The first level of the security level may have a higher security strength than the second level, the second level may have a higher security strength than the third level, and the third level may have a higher security strength than the fourth level, for example.

User authentication methods may be different according to security strength.

The authentication method may include password authentication, biometric (face, pupil, iris, fingerprint, voice, vein, etc.) authentication, account login authentication, authentication through a mobile device, and the like, for example.

The number of user authentication may vary according to security strength. For example, the higher the security strength, the more types and number of authentication methods may be required.

For example, if the security strength is the first level, four types of authentication may be performed, and if the security level is the fourth level, only one type of authentication may be performed.

The first processor 124 may communicate with the mobile device 2 when a communication connection signal is received from the mobile device 2 in response to the success of the communication connection attempt with the mobile device 2, and when information transmitted from the mobile device 2 is received, may control the operation of at least one electronic device based on a control command within the received information so that a function corresponding to the received information is performed.

For example, the first processor 124 may control unlocking of the door when the unlocking command of the door is received from the mobile device 2 connected through communication, may lock the door when the locking command of the door is received from the mobile device 2 connected through communication, and may control the lighting of the lamp when the lighting command of the lamps is received from the mobile device 2 connected through communication.

The first processor 124 may control the start of the engine when the on command of the vehicle is received from the mobile device 2 connected through communication, and may control the start of the engine when the on command of the vehicle is received through the start button while communication is connected with the mobile device 2.

If the handle provided on the door is automatically drawn in and out, the first processor 124 may control unlocking of the door and a withdrawal of the handle when the unlocking command of the door is received from the mobile device 2 connected through communication, and may lock the door and a retraction of the handle when the locking command of the door is received from the mobile device 2 connected through communication.

When a connection signal is received from the mobile device, the first processor 124 may compare the identification information of the registered mobile device with the identification information of the mobile device connected through communication, and may determine whether the registered mobile device with the mobile device connected through communication are the same.

When the identification information of the registered mobile device 2 and the identification information of the mobile device 2 connected through communication are the same, the first processor 124 may control the electronic devices to perform the operation corresponding to information received from the mobile device 2 connected to communication.

When the identification information of the registered mobile device 2 and the identification information of the mobile device 2 connected through communication are different, the first processor 124 may reject or hold the operation control of at least one electronic device corresponding to the information received from the mobile device 2 connected through communication.

When the communication connection signal is received from the mobile device 2, the first processor 124 may obtain distance information with the mobile device 2 based on the transmission power in the beacon packet and the received signal strength of the signal transmitted from the mobile device 2, may determine whether a distance to the mobile device 2 is less than or equal to a reference distance based on the obtained distance information and reference distance information, may control the operation of at least one electronic device based on information transmitted from the mobile device 2 when it is determined that the distance to the mobile device 2 is equal to or less than the reference distance, and may hold or reject the operation control of at least one electronic device corresponding to information transmitted from the mobile device 2 when it is determined that the distance to the mobile device 2 exceeds the reference distance.

The first processor 124 may transmit operation control failure information to the mobile device 2 when the operation control of at least one electronic device corresponding to the information transmitted from the mobile device 2 fails, and may transmit information about exceeding the reference distance to the mobile device 2 when the distance to the mobile device 2 exceeds the reference distance.

The first processor 124 may include a memory (not shown) configured to store data regarding an algorithm for executing the operations of the components of the vehicle or a program that represents the algorithm, and may include a processor (not shown) that performs the above described operations using the data stored in the memory. In particular, the first memory 125 and the first processor 124 may be implemented as separate chips. Alternatively, the first memory 125 and the first processor 124 may be implemented as a single chip.

The first memory 125 may store the reference received signal strength.

The first memory 125 may store distance information corresponding to received signal strength for each communication method.

For example, the first memory 125 may store distance information corresponding to received signal strength of Bluetooth communication and distance information corresponding to received signal strength of Wi-Fi communication.

The first memory 125 may store the first reference constellation map and the first reference print pattern corresponding to the first reference constellation map.

The first memory 125 may store the identification information of the mobile device 2, the registration information of the user, and the identification information of the vehicle 1.

The first memory 125 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, for example, but the implementation of the first memory is not limited thereto.

The first memory 25 may be a memory implemented as a chip separated from the first processor 124, which has been described above in connection with the first processor 124, or may be implemented as a single chip integrated with the processor 124.

The starting device 126 may include at least one of a driving motor and an engine for applying driving force to wheels. In an embodiment, the engine may operate the starting motor based on the on command of the first processor 124 when starting, and stop the operation based on the off command of the first processor 124.

The locking member 127 may be provided to be connected to the plurality of doors, and may perform locking or unlocking of at least one door 111 based on the locking command or unlocking command of the first processor 124.

The vehicle may further include a lamp driving device. In this case, the first processor 124 may control the lamp driving device to turn on the lamp when information corresponding to the lighting command of the lamps is received from the authenticated mobile device 2.

At least one component may be added or deleted according to performance of the components of the vehicle shown in FIG. 2. Furthermore, it will be readily understood by those of ordinary skill in the art that mutual positions of the components may be changed corresponding to the performance or structure of the system.

On the other hand, each component shown in FIG. 2 may refer to software and/or hardware components such as a field programmable gate array (FPGA) and an application specific integrated circuit (ASIC).

Figure 9:
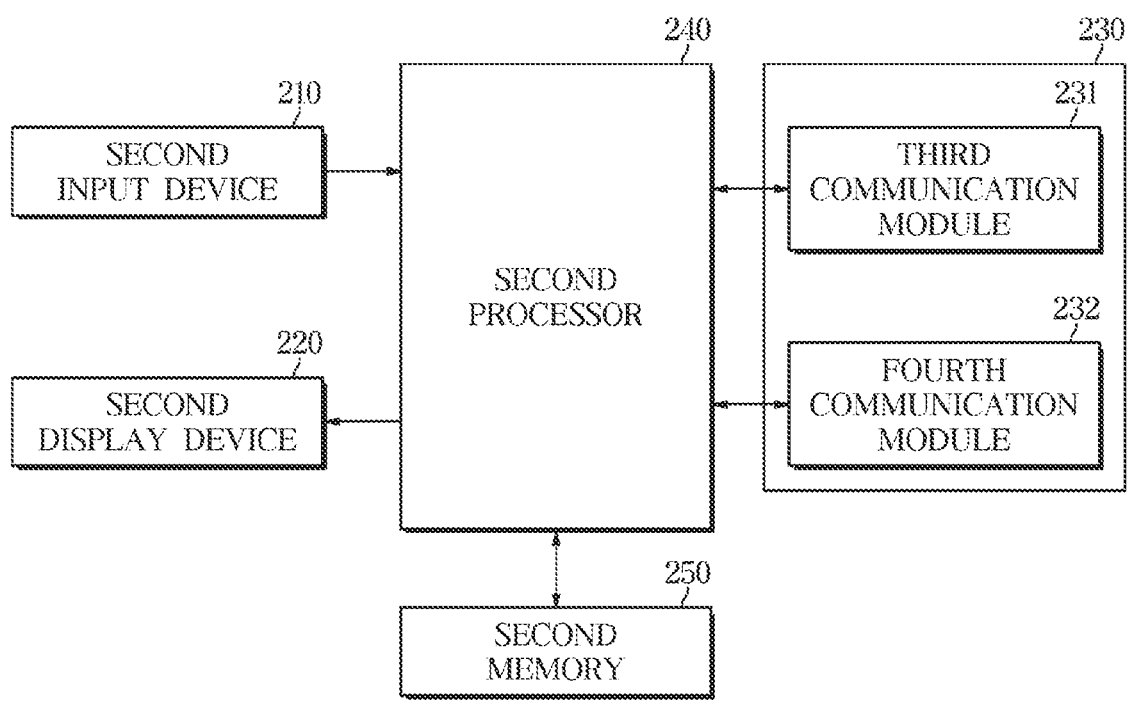
FIG. 9 is a view illustrating a control block diagram of a mobile device communicating with a vehicle according to an embodiment of the disclosure.
Figure 10A:
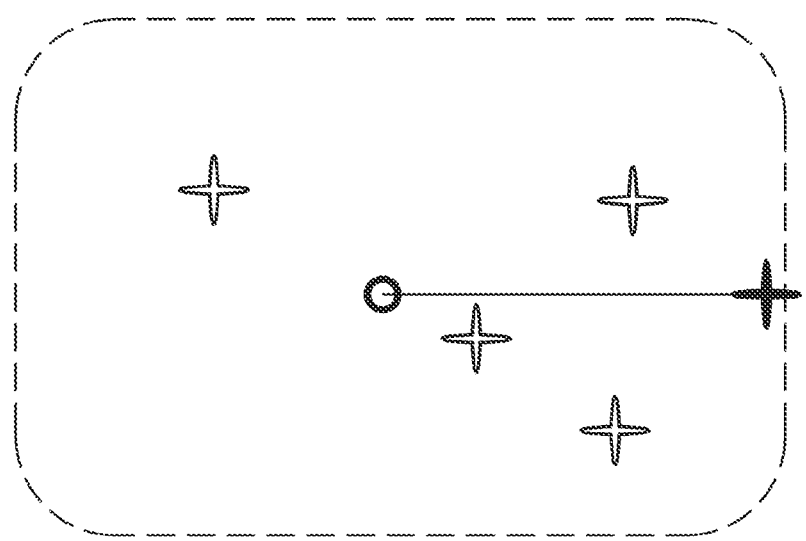
FIG. 10A and FIG. 10B are views illustrating a generation of a constellation map and a print pattern of a constellation map of wireless communication apparatuses of a second type of a mobile device according to an embodiment of the disclosure.
Figure 10B:
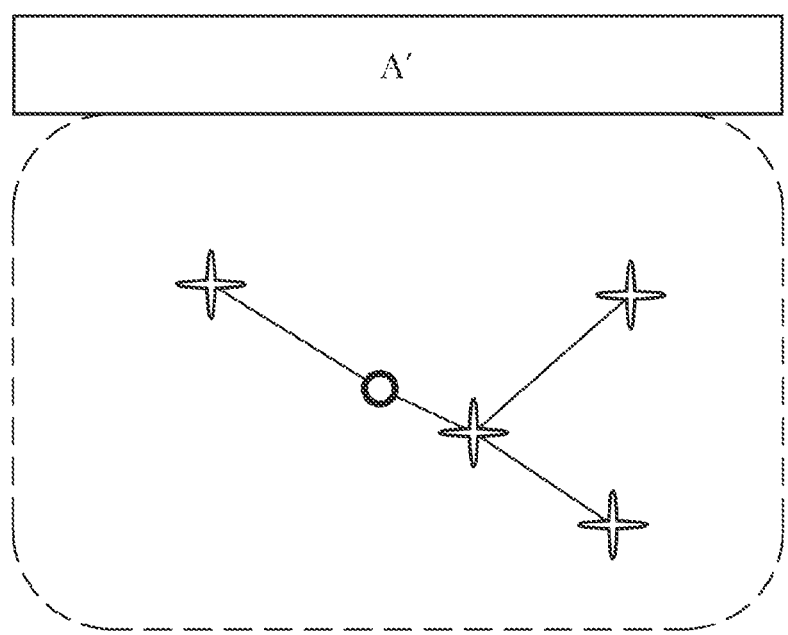

FIG. 9 is a control configuration diagram of a mobile device 2 communicating with a vehicle 1 according to an embodiment, and will be described also with reference to FIGS. 10A and 10B.

The mobile device 2 includes a second input device 210, a second display device 220, a second communication device 230, a second processor 240, and a second memory 250.

The second input device 210 may receive a user input. This second input device 210 may receive a registration command and registration authentication information as a digital key. The second input device 210 may receive a control command for controlling the operation of the vehicle 1.

The second input device 210 may receive at least one of a communication connection attempt command with the vehicle 1, a locking and unlocking command for the door of the vehicle 1, a locking and unlocking command for the tailgate of the vehicle 1, an on command of the vehicle 1, and a lighting command of the lamps the vehicle 1, for example.

The second input device 210 may receive a download command of an application, a setup command of the application, a member registration command, and an execution command of the application, for example.

The second input device 210 may receive a command to generate a constellation map or a print pattern corresponding to the constellation map while the application is running.

The second input device 210 may be a button type pressed by a user and/or a touch type touched by the user.

The second display device 220 may display input information received to the second input device 210.

The second display device 220 may display information about a registration process of the mobile device 2.

The second display device 220 may display communication connection success information or failure information based on the control command of the second processor 240.

The second display device 220 may display a plurality of buttons having control commands transmittable to the vehicle 1 when communication is connected with the vehicle 1.

The second display device 220 may display operation performance information corresponding to the control command transmitted to the vehicle 1. For example, the second display device 220 may display door locking completion or failure information corresponding to the locking command of the door, may display door unlocking completion or failure corresponding to the unlocking command of the door, may display lamp lighting completion or lamp lighting failure corresponding to the lighting command of the lamps transmitted to the vehicle, or may display the remaining time until the lamp is turned off.

The second input device 210 may include a touch panel and the second display device 220 may include a display panel. The touch panel of the second input device 210 and the display panel of the second display device 220 may be integrally provided with each other. That is, the touch panel of the second input device 210 and the display panel of the second display device 220 may be implemented as a touch screen.

The second communication device 230 may include one or more components enabling communication between internal components of the mobile device 2, and may include one or more components enabling communication with an external device.

For example, the second communication device 230 may include at least one of a short-distance communication module, a wired communication module, and a wireless communication module. The external devices may be the vehicle 1, the server 3, and one or more wireless communication apparatuses 4.

The short-distance communication module, the wired communication module, and the wireless communication module of the second communication device 230 may be similar to or identical to the short-distance communication module, the wired communication module, and the wireless communication module of the first communication device 123.

The second communication device 230 may include a third communication module 231 performing the same communication as the first communication module 123a of the vehicle 1 and a fourth communication module 232 performing the same communication as the second communication module 123b of the vehicle 1.

The second processor 240 may activate the second communication device 230 based on a registration command of the mobile device received by the second input device 210, and may transmit a registration agreement command received the second input device 210 to the vehicle 1. The second processor 240 may transmit registration authentication information received by the second input device 210 to the vehicle 1.

The registration command of the mobile device 2 may be a command for registering a digital key to control the vehicle 1 in the mobile device.

The second processor 240, in response to receiving the beacon packet from the vehicle 1 in the registration of the mobile device 2 in the vehicle, may be configured to permit information regarding the universal unique identification number (Proximity UUID) field, the major field, and the minor field included in data in the received beacon packet to be stored in the second memory 250.

Alternatively, the second processor 240 may be configured to receive information regarding the Proximity UUID field, the major field, and the minor field included in data in the beacon packet from the vehicle 1 when the registration of the mobile device 2 in the vehicle is completed, and permit the received information to be stored in the second memory 250.

Further, the second processor 240 may be configured to obtain a shared key and an encryption key based on the received information regarding the field, the Major field, and the Minor field, and control the second memory 250 to store the obtained shared key and the encryption key therein.

The second processor 240 may be configured to parse a packet in the registration of the mobile device in the vehicle, and when the packet is determined to be the beacon packet received from the vehicle 1, and control the second display device 220 to display the information regarding the Proximity UUID field, the Major field, and the Minor field in the data field in the beacon packet thereon.

The second processor 240 may be configured to control the second memory 250 to store identification information of the vehicle 1 when mobile device registration completion information is received from the vehicle. In other words, the mobile device 2 may be configured to store the vehicle having transmitted the beacon packet as the vehicle to be operated through the function of a digital key.

The second processor 240 may be configured, when a function of the digital key is performed after the completion of the mobile device registration, to attempt a communication connection with the vehicle 1 by activating the second communication device 230.

The second processor 240 may determine that there is the vehicle nearby and attempt the communication connection with the vehicle when the advertising signal transmitted from the vehicle is received during scanning of the advertising signal.

When the advertising signal is received, the second processor 240 may obtain distance information from the vehicle 1 based on the received signal strength, and may determine whether a distance to the vehicle 1 is within a predetermined distance based on the obtained distance information and reference distance information.

Additionally, the second processor 240, in response to receiving the ADV signal, may be configured to initialize the communication connection again and permit communication with the vehicle 1 to be performed through the connection method.

The second processor 240, in response to receiving the ADV signal, may be configured to identify the UUID of the data field in the beacon packet stored in the second memory 250, and decrypt the received ADV signal using the identified UUID as the encryption key to obtain data.

When the advertising signal is received, the second processor 240 may determine whether the received identification information of the vehicle and the pre-stored identification information of the vehicle by comparing the received identification information of the vehicle with the pre-stored identification information of the vehicle, and when the received identification information of the vehicle and the pre-stored identification information of the vehicle are the same, may determine that the vehicle transmitting the advertising signal is a vehicle to be controlled through the mobile device 2.

When the advertising signal transmitted from the vehicle 1 is received, the second processor 240 may transmit a Bluetooth broadcasting response signal corresponding to the advertising signal to the vehicle 1.

When state information on a parking state or a stopped state is received from the vehicle 1, the second processor 240 may control the second communication device 230 to scan one or two or more wireless communication apparatuses 4 around the mobile device 2.

The second processor 240 may scan one or more wireless communication apparatuses 4 at the same position as the vehicle 1.

When a command to generate a constellation map or a command to generate a print pattern corresponding the constellation map is received from the second input device 210, the second processor 240 may control the second communication device 230 to scan one or two or more wireless communication apparatuses 4 around the mobile device 2.

When response signals are received from the wireless communication apparatuses 4, the second processor 240 may identify the received signal strength of each of the received response signals, and may obtain distance information of each of the wireless communication apparatuses 4 based on each received signal strength. The distance information of each of wireless communication apparatuses may be relative distance information with respect to the mobile device 2.

When a response signal is received from the wireless communication apparatuses 4, the second processor 240 may identify identification information of the wireless communication apparatuses 4 from the received response signal.

The second processor 240 may classify wireless communication apparatuses 4 that transmit response signals based on the identification information of the wireless communication apparatuses 4 into the first type of wireless communication apparatus and the second type of wireless communication apparatus.

In this case, for example, when the response signal is received from the wireless communication apparatuses 4, the second processor 240 may classify the received response signal from the wireless communication apparatuses 4 into a first response signal without position information and a second response signal including position information.

The second processor 240 may identify the received signal strength of the first response signal and may obtain distance information of the wireless communication apparatuses 4 that have transmitted the first response signal based on the identified received signal strength.

The second processor 240 may identify a received signal strength and position information of the second response signal, may obtain distance information of the wireless communication apparatuses 4 that have transmitted the second response signal based on the identified received signal strength, may obtain direction information of the wireless communication apparatuses 4 that have transmitted the second response signal based on the position information, and may obtain relative position information of the wireless communication apparatuses 4 that have transmitted the second response signal based on the obtained distance information and the obtained direction information.

The second processor 240 may determine the wireless communication apparatus transmitting the first response signal received by the third communication module 231 as the first type of wireless communication apparatus, and may determine the wireless communication apparatus transmitting the second response signal received by the fourth communication module 232 as the second type of wireless communication apparatus.

The second processor 240 may obtain distance information with the first type of wireless communication apparatus 4 that have transmitted the first response signal received through the third communication module 231 based on the received signal strength of the first response signal received through the third communication module 231.

The second processor 240 may identify the received signal strength and the position information of each of the second response signals received through the fourth communication module 232, may obtain distance information of each of the second type of wireless communication apparatuses 4 that have transmitted the second response signal based on the identified received signal strength of the second response signal, may obtain direction information of each of the second type of wireless communication apparatuses 4 that have transmitted the second response signal based on the identified position, and may obtain relative position information of each of the second type of wireless communication apparatuses 4 that have transmitted the second response signal based on the obtained distance information and the obtained direction information.

The second processor 240 may identify the first type of wireless communication apparatuses having the fixed position based on the identification information of the first type of wireless communication apparatuses, and may obtain relative distance information of the first type of wireless communication apparatuses having the fixed position. The second processor 240 may identify the first type of wireless communication apparatuses to be moved based on the identification information of the first type of wireless communication apparatuses. The second processor 240 may exclude the first type of wireless communication apparatuses to be moved among wireless communication apparatuses to be recorded in the constellation map.

The second processor 240 may identify the received signal strength of each of the first type of wireless communication apparatuses, and may compare a reference received signal strength and the received signal strength of each of the first type of wireless communication apparatuses. The second processor 240 may identify the first type of wireless communication apparatuses in which the received signal strength of the first type of wireless communication apparatus is less than the reference received signal strength among the first type of wireless communication apparatuses, and may exclude the identified first type of wireless communication apparatuses from the wireless communication apparatuses to be recorded in the constellation map.

The second processor 240 may identify the second type of wireless communication apparatuses having a fixed position based on the identification information of each of the second type of wireless communication apparatuses, and may obtain the relative distance information of each of the second type of wireless communication apparatuses having the fixed position. The second processor 240 may identify the second type of wireless communication apparatuses to be moved based on the identification information of each of the second type of wireless communication apparatuses, may exclude the second type of wireless communication apparatuses to be moved from the constellation map, and may generate the constellation map using the relative distance information of each of the second type of wireless communication apparatuses having the fixed position.

The second processor 240 may identify the received signal strength of each of the second type of wireless communication apparatuses, and may compare a reference received signal strength and the received signal strength of each of the second type of wireless communication apparatuses. The second processor 240 may identify the second type of wireless communication apparatuses in which the received signal strength of the second type of wireless communication apparatus is less than the reference received signal strength among the second type of wireless communication apparatuses, and may exclude the identified second type of wireless communication apparatuses from the wireless communication apparatuses to be recorded in the constellation map.

The second processor 240 may select the second type of wireless communication apparatuses having fixed position among the second type of wireless communication apparatuses that have transmitted the second response signal, and may record the constellations of the selected second type of wireless communication apparatuses based on the relative position information of the selected second type of wireless communication apparatuses.

As shown in FIG. 6A, the second processor 240 may generate a constellation map by recording the relative positions of the selected second type of wireless communication apparatuses as constellations (*) based on the position (o) of the mobile device 2 on a one-dimensional plane.

As shown in FIG. 6B, the second processor 240 may connect stars adjacent to the vehicle to the vehicle in a straight line based on the position (o) of the mobile device 2 on the one-dimensional plane, and may generate a print pattern of the constellation map by connecting adjacent stars among stars not adjacent to the mobile device 2 in the straight line.

The print pattern of the constellation map may be generated in the server 3 and stored in the server 3.

The second processor 240 may select the first type of wireless communication apparatuses having fixed position among the first type of wireless communication apparatuses that have transmitted the first response signal, and may generate a constellation map by recording the constellations of the selected first type of wireless communication apparatuses based on the relative distance information of the selected first type of wireless communication apparatuses.

As illustrated in FIG. 7, the second processor 240 may record the relative distance of the selected first type of wireless communication apparatuses on the same straight line as the position of the mobile device 2 based on the position (o) of the mobile device on the one-dimensional plane by the constellation (*), and generates the constellations recorded on the straight line as the constellation map.

The second processor 240 may generate the print pattern of the constellation map by connecting the constellation maps on the one-dimensional plane with the straight line.

The second processor 240 may select the first and second types of wireless communication apparatuses 4 having fixed position among the wireless communication apparatuses that transmit the first and second response signals, may record the constellation on the same line as the mobile device based on the position of the mobile device based on the distance information of the selected first type of wireless communication apparatuses, may generate a constellation map by recording the constellation based on the position of the mobile device 2 and based on the relative position information of the selected second type of wireless communication apparatuses 4, and may generate a print pattern corresponding to the constellation map.

The relative position information may include relative distance information and relative direction information.

When the vehicle 1 is parked or stopped, the second processor 240 may store the initially generated constellation map as a second reference constellation map, and may store the print pattern corresponding to the initially generated constellation map as a second reference print pattern corresponding to the second reference constellation map.

The second processor 240 may store the generated second reference constellation map in the second memory 250, and may transmit the generated second reference constellation map to the server 3.

The second processor 240 may transmit the second reference constellation map of the mobile device 2, the identification information of the vehicle 1, and current position information to the server 3 together.

The second processor 240 may store the second reference print pattern corresponding to the second reference constellation map in the second memory 250 and transmit the second reference print pattern to the server 3.

The second processor 240 may transmit the second reference print pattern corresponding to the second reference constellation map to a local device (not shown) performing a local constellation print pattern check.

When the vehicle 1 is parked or stopped, the vehicle 1 and the mobile device 2 may generate the constellation map and the print pattern corresponding to the constellation map at the same position. However, scan results of one or more wireless communication apparatuses 4 may differ slightly depending on differences in hardware between the vehicle 1 and the mobile device 2. Accordingly, the constellation map and the print pattern of the vehicle 1 and the constellation map and the print pattern of the mobile device 2 may not be 100% identical.

That is, the constellation map of the vehicle 1 and the mobile device 2 may be similar or identical. The print pattern of vehicle 1 and the print pattern of the mobile device 2 may be similar or identical.

When the advertising signal of the vehicle 1 is received, the second processor 240 scans one or more wireless communication apparatuses 4 nearby, regenerates the constellation map based on the received signal strength and the identification information of the scanned wireless communication apparatuses 4, and regenerates the print pattern corresponding to the regenerated constellation map based on the generated constellation map.

The second processor 240 may transmit the regenerated constellation map to the server 3 and the vehicle 1. In this case, for example, the server 3 may regenerate the print pattern of the constellation map based on the received constellation map of the mobile device 2, and may transmit the regenerated print pattern of the regenerated constellation map to the vehicle 1 and the mobile device 2.

The second processor 240 may transmit the regenerated print pattern of the constellation map to the server 3 and the vehicle 1.

The second processor 240 may activate the digital key when a communication connection signal is received from the vehicle 1.

The second processor 240 may control the display of request information requesting input of authentication information corresponding to the security level of the vehicle 1, and transmit the authentication information received through the second input device 210 to the vehicle 1 and the server 3.

The second processor 240 may identify the identification information of the vehicle 1 based on the advertising signal, and when the identified identification information of the vehicle and the pre-stored identification information of the vehicle are different, may determine that the vehicle that has transmitted the advertising signal is not a control target vehicle to be controlled through the function of the digital key.

When the identified identification information of the vehicle and the pre-stored identification information of the vehicle are the same, the second processor 240 may determine that the vehicle that has transmitted the advertising signal is the control target vehicle to be controlled through the function of the digital key, and may control the second display device 220 to display communication connection information with the vehicle 1.

The second processor 240 may control the operation of the second display device 220 to display communication connection failure information when communication connection with the vehicle 1 fails.

When a relay attack detection event is received from the vehicle 1 through the server 3, the second processor 240 may control the second display device 220 to display the received relay attack detection event, and may output the received relay attack detection event to a speaker (not shown) provided in the mobile device 2, for example.

When an application execution command is received through the second input device 210, the second processor 240 may control the execution of the application and control the second display device 220 to display an execution image of the application being executed.

The second processor 240 may transmit the user input received through the second input device 210 to the vehicle 1 through the server 3 while the application is running.

The second processor 240 may directly transmit the user input received through the second input device 210 to the vehicle 1 while the application is running.

The user input received by the second input device 210 may include an on/off command of the vehicle, a locking/unlocking command of the door, and may include operation information of at least one electronic device provided in the vehicle, for example. The at least one electronic device may include a seat ventilation device, a seat heating wire, a steering wheel heating wire, an air conditioner, and audio device, for example.

The second memory 250 may store information on a proximity UUID (Universal Unique ID) field, a major field, and a minor field included in the data field of a beacon packet stored in the vehicle 1.

The information on the beacon packet is information for verifying whether the vehicle 1 attempting communication connection is a vehicle registered with the mobile device 2 when attempting communication between the vehicle 1 and the mobile device 2 after registration of the mobile device.

In addition, the information on beacon packets may be used as information for verifying whether the mobile device 2 attempting a communication connection is a registered mobile device when attempting communication between the vehicle 1 and the mobile device 2 after registration of the mobile device.

The second memory 250 may store the constellation map and may further store the print pattern corresponding to the constellation map.

The second memory 250 may also store the identification information of the vehicle 1, the identification information of the mobile device 2, and the identification information of the user, for example.

The second memory 250 may also store user registration information matched with the vehicle 1.

At least one component may be added or deleted according to performance of the components of the mobile device 2 shown in FIG. 9. Furthermore, it will be readily understood by those of ordinary skill in the art that mutual positions of the components may be changed corresponding to the performance or structure of the system.

On the other hand, each component shown in FIG. 9 may refer to software and/or hardware components such as a field programmable gate array (FPGA) and an application specific integrated circuit (ASIC), for example.

FIG. 11 is a view illustrating a flowchart of generating a print pattern of a constellation map of a vehicle according to an embodiment of the disclosure.

A digital key may be automatically generated in a mobile device 2 during a registration process of the mobile device. The mobile device 2 may transmit the generated digital key to a vehicle 1.

When the mobile device 2 is registered, the vehicle 1 may generate the digital key and transmit the generated digital key to the mobile device.

The vehicle 1 may store the digital key, and may further store identification information of the registered mobile device and registration information of a user.

The vehicle 1 may be remotely controlled by the mobile device 2 in which the digital key is stored.

The vehicle 1 may determine whether the vehicle is parked (131), and when it is determined that the vehicle is parked, may scan wireless communication apparatuses 4 present around the vehicle (132).

The vehicle may determine whether the vehicle is stopped, and when it is determined that the vehicle is stopped, may scan the wireless communication apparatuses 4 present around the vehicle.

When a response signal is received from the wireless communication apparatuses 4 (133), the vehicle may identify the received signal strength of the received response signal and identification information of the wireless communication apparatuses 4.

The vehicle may classify the response signal received in a first communication module 123a into a first response signal and the response signal received in a second communication module 123b into a second response signal.

The vehicle may determine that the wireless communication apparatus transmitting the first response signal received in the first communication module 123a is a first type of wireless communication apparatus, and may determine that the wireless communication apparatus transmitting the second response signal received in the second communication module 123b is a second type of wireless communication apparatus.

The vehicle may obtain distance information of the first type of wireless communication apparatus that have transmitted the first response signal received through the first communication module 123a based on the received signal strength of the first response signal received through the first communication module 123a (action 134).

The vehicle may identify a received signal strength and position information of the second response signal received through the second communication module 123b, may obtain distance information of the second type of wireless communication apparatus that have transmitted the second response signal received through the second communication module 123b based on the received signal strength of the second response signal received through the second communication module 123b, may obtain direction information of the second type of wireless communication apparatus that have transmitted the second response signal received through the second communication module 123b based on the position information of the second response signal received through the second communication module 123b, may obtain relative position information of the second type of wireless communication apparatuses 4 that have transmitted the second response signal based on the obtained distance information and the obtained direction information (action 134).

The vehicle may identify the first type of wireless communication apparatuses having the fixed position based on the identification information of the first type of wireless communication apparatuses, and may obtain relative distance information of the first type of wireless communication apparatuses having the fixed position. The vehicle may identify the first type of wireless communication apparatuses to be moved based on the identification information of the first type of wireless communication apparatuses. The vehicle may exclude the first type of wireless communication apparatuses to be moved among wireless communication apparatuses to be recorded in the constellation map.

The vehicle may identify the second type of wireless communication apparatuses having a fixed position based on the identification information of each of the second type of wireless communication apparatuses, and may obtain the relative distance information of each of the second type of wireless communication apparatuses having the fixed position. The vehicle may identify the second type of wireless communication apparatuses to be moved based on the identification information of each of the second type of wireless communication apparatuses, and may exclude the second type of wireless communication apparatuses to be moved from the constellation map (action 135).

The vehicle may identify the received signal strength of each of the first type of wireless communication apparatuses, and may compare a reference received signal strength and the received signal strength of each of the first type of wireless communication apparatuses. The vehicle may identify the first type of wireless communication apparatuses in which the received signal strength of the first type of wireless communication apparatus is less than the reference received signal strength among the first type of wireless communication apparatuses, and may exclude the identified first type of wireless communication apparatuses from the wireless communication apparatuses to be recorded in the constellation map.

The vehicle may identify the received signal strength of each of the second type of wireless communication apparatuses, and may compare a reference received signal strength and the received signal strength of each of the second type of wireless communication apparatuses. The vehicle may identify the second type of wireless communication apparatuses in which the received signal strength of the second type of wireless communication apparatus is less than the reference received signal strength among the second type of wireless communication apparatuses, and may exclude the identified second type of wireless communication apparatuses from the wireless communication apparatuses to be recorded in the constellation map (action 136).

The vehicle may select the remaining first type of wireless communication apparatuses among the first type of wireless communication apparatuses transmitting the first response signal and the remaining second type of wireless communication apparatuses among the second type of wireless communication apparatuses transmitting the second response signal, and may generate a constellation map using the selected remaining first type of wireless communication apparatuses and the selected remaining second type of wireless communication apparatuses.

The vehicle may generate a constellation map by recording a constellation on the same line as the vehicle based on the position of the vehicle and based on the distance information of the selected first type of wireless communication apparatuses, and may record the constellation based on the position of the vehicle and based on the relative distance information of the selected second type of wireless communication apparatuses (action 137), and may generate a print pattern corresponding to the constellation map (action 138).

When the vehicle is parked or stopped, the vehicle may store an initially generated constellation map as a first reference constellation map, and may store the print pattern corresponding to the initially generated constellation map as a first reference print pattern (A) corresponding to the first reference constellation map.

The vehicle 1 may store the generated first reference constellation map in the first memory 125, and may transmit the generated first reference constellation map to the server 3.

The vehicle 1 may transmit the first reference constellation map, the identification information of the vehicle, and current position information to the server 3 together.

When the first reference print pattern corresponding to the first reference constellation map is generated in the vehicle, the vehicle may store the first reference print pattern corresponding to the first reference constellation map in the first memory 125 and transmit the first reference print pattern to the server 3.

When the vehicle is parked or stopped, the mobile device 2 may scan the wireless communication apparatuses 4 around the mobile device. At this time, the mobile device 2 may generate a second reference constellation map based on the received signal strength of the first type of wireless communication apparatuses scanned and the received signal strength and the position information of the second type of wireless communication apparatuses scanned, and may generate a second reference print pattern based on the second reference constellation map.

When only the second reference constellation map is generated by the mobile device 2, the server 3 may generate the second reference print pattern corresponding to the second reference constellation map based on the second reference constellation map received from the mobile device 2.

FIG. 12 is a view illustrating a control flowchart of a vehicle according to an embodiment of the disclosure.

When a mobile device 2 is scanned while a vehicle is parked, the vehicle 1 may regenerate a constellation map and/or a print pattern corresponding to the constellation map.

When the mobile device 2 is scanned while the vehicle is stopped, the vehicle 1 may regenerate the constellation map and/or the print pattern corresponding to the constellation map.

When an on command of the vehicle is received (decision 142) through a start button or the mobile device 2 while the vehicle is parked (decision 141), the vehicle 1 may scan wireless communication apparatuses around the vehicle (action 143).

When a response signal is received (decision 144), the vehicle 1 regenerates the constellation map based on the received response signal and regenerates the print pattern (C) corresponding to the regenerated constellation map based on the regenerated constellation map (action 145).

In an embodiment, regenerating the constellation map and the print pattern corresponding to the constellation map may be the same as generating the constellation map and the print pattern of the constellation map in FIG. 11.

The mobile device 2 may also scan the wireless communication apparatuses 4 around the mobile device when the vehicle 1 is scanned, and when a response signal is received, regenerates the constellation map based on the received response signal, and regenerates the print pattern (B) based on the regenerated constellation map.

The mobile device 2 may transmit the regenerated print pattern (B) and the regenerated constellation map to the vehicle.

The vehicle 1 may receive a first reference constellation map or the first reference print pattern (A) corresponding to the first reference constellation map, and the second reference print pattern (A') corresponding to the second reference constellation map or second reference constellation map from the server 3 (action 146).

The vehicle may receive the regenerated print pattern (B) corresponding to the regenerated constellation map from the mobile device 2 (action 147).

The vehicle 1 determines whether the print patterns are identical by comparing the first reference print pattern (A) corresponding to the first reference constellation map, the second reference print pattern (A') corresponding to the second reference constellation map, the regenerated print pattern (C) corresponding to the constellation map regenerated in the vehicle, and the regenerated print pattern (B) corresponding to the constellation map regenerated in the mobile device 2.

The vehicle 1 determines whether the regenerated print pattern (C) and the first reference print pattern (A) are the same by comparing the regenerated print pattern (C) and the first reference print pattern (A).

The vehicle determines whether the regenerated print pattern (C) and the first reference print pattern (A) are the same by comparing the regenerated print pattern (B) and the second reference print pattern (A').

When the regenerated print pattern (C) and the first reference print pattern (A) are the same, the vehicle determines whether the regenerated print pattern (B) and the second reference print pattern (A') are the same.

When the regenerated print pattern (C) and the first reference print pattern (A) are the same and the regenerated print pattern (B) and the second reference print pattern (A') are the same, the vehicle determines whether the regenerated print pattern (B) and the regenerated print pattern (C) are the same.

The vehicle determines whether both the first reference print pattern (A), the second reference print pattern (A'), the regenerated print pattern (C), and the regenerated print pattern (B) are different (action 148).

When the regenerated print pattern (C) and the first reference print pattern (A) are different, the regenerated print pattern (B) and the second reference print pattern (A') are different and the regenerated print pattern (B) and the regenerated print pattern (C) are different (decision 149), the first processor 124 controls a deactivation of the digital key (action 150), and controls the electronic devices in the vehicle so that control of the vehicle is impossible.

When both the first reference print pattern (A), the second reference print pattern (A'), the regenerated print pattern (C), and the regenerated print pattern (B) are different, the vehicle may set a security level based on the comparison result (action 151) and activate the digital key (action 152).

When the regenerated print pattern (C) and the first reference print pattern (A) are the same, the vehicle may set the security level to a first level, may control the activation of the digital key, and may control the electronic devices provided in the vehicle to enable control of the vehicle, for example.

When determining whether the first reference print pattern and the regenerated print pattern are the "same," the vehicle identifies a matching rate of the first reference print pattern and the regenerated print pattern, and when the identified matching rate is greater than or equal to the reference matching rate, determines that the first reference print pattern and the regenerated print pattern are the "same," and when the identified matching rate is less than the reference matching rate, determines that the first reference print pattern and the regenerated print pattern are "different."

When the regenerated print pattern (B) and the second reference print pattern (A') are the same, the vehicle may set the security level to a second level, may control the activation of the digital key, and may control the electronic devices provided in the vehicle to enable control of the vehicle, for example.

When the regenerated print pattern (C) and the first reference print pattern (A) are the same and the regenerated print pattern (B) and the second reference print pattern (A') are the same, the vehicle may set the security level to a third level, may control the activation of the digital key, and may control the electronic devices provided in the vehicle to enable control of the vehicle, for example.

When the regenerated print pattern (C) and the first reference print pattern (A) are the same, the regenerated print pattern (B) and the second reference print pattern (A') are the same and the regenerated print pattern (B) and the regenerated print pattern (C) are the same, the vehicle may set the security level to a fourth level, may control the activation of the digital key, and may control the electronic devices provided in the vehicle to enable control of the vehicle, for example.

The first level of the security level may have a higher security strength than the second level, the second level may have a higher security strength than the third level, and the third level may have a higher security strength than the fourth level.

User authentication methods may be different according to security strength.

The authentication method may include password authentication, biometric (face, pupil, iris, fingerprint, voice, vein, etc.) authentication, account login authentication, authentication through a mobile device, and the like, for example.

The number of user authentication may vary according to security strength. For example, the higher the security strength, the more types and number of authentication methods may be required, for example.

For example, if the security strength is the first level, four types of authentication may be performed, and if the security level is the fourth level, only one type of authentication may be performed.

When authentication is successful by the security request, the vehicle may transfer the authorization control to control the vehicle using the digital key to the mobile device 2. At such time, the mobile device 2 may control one or more electronic devices provided in the vehicle using the stored digital key, for example.

As is apparent from the above, according to the embodiments of the disclosure, the embodiments of the disclosure may perform double security by using the constellation map generated based on wireless signals of various wireless communication apparatuses.

According to the embodiments of the disclosure, the embodiments of the disclosure may prevent theft of a vehicle and theft of items in a vehicle through indirect communication between the vehicle 1 and the mobile device 2. That is, the embodiments of the disclosure may prevent vehicle theft and items in the vehicle from RSA (Relay Station Attack or Relay Attack), for example.

That is, the embodiments of the disclosure may prevent theft of the vehicle through a sniffing attack of a wireless communication signal for using the digital key, for example.

The embodiments of the disclosure may adjust the security level according to the theft type, for example. The embodiments of the disclosure may improve scalability and reliability of vehicle security, for example.

Because the embodiments of the disclosure may not require the use of Ultra Wide Band (UWB) technology, it may be possible to reduce purchase and investment costs for hardware or software related to digital key security, for example. That is, the embodiments of the disclosure may provide various digital key services even to the mobile device that is not equipped with ultra-wideband wireless technology (UWB), for example.

Through this, the user of the vehicle may use various services of the digital key while using a low-cost mobile device, for example.

As described above, the embodiments of the disclosure may improve the quality and marketability of the vehicle by strengthening security for communication with the mobile device, for example.

The embodiments of the disclosure may improve user convenience, improve vehicle safety, and secure product competitiveness, for example.

Meanwhile, embodiments may be stored in the form of a recording medium storing computer-executable instructions, for example. The instructions may be stored in the form of a program code, and when executed by a processor, the instructions may perform operations of the disclosed embodiments. The recording medium may be implemented as a computer-readable recording medium, for example.

The computer-readable recording medium may include all kinds of recording media in which instructions which may be decoded by a computer are stored of, for example, a read only memory (ROM), random access memory (RAM), magnetic tapes, magnetic disks, flash memories, optical recording medium, and the like, for example.

Although embodiments have been described for illustrative purposes, those skilled in the art will appreciate that various modifications, additions, and substitutions may be possible, without departing from the scope and spirit of the disclosure. Therefore, embodiments have not been described for limiting purposes.

What is claimed is:

1. A vehicle comprising:
a communication device configured to communicate with wireless communication apparatuses and a mobile device in which a digital key is stored; and
a processor configured to:
obtain relative position information of the wireless communication apparatuses based on a received signal strength of the wireless communication apparatuses received by the communication device;
generate a constellation map based on the obtained relative position information of the wireless communication apparatuses;
generate a print pattern corresponding to the constellation map based on a position of the vehicle; and
control activation of the digital key based on the generated print pattern.

2. The vehicle according to claim 1, further comprising:
an input device; and
a memory;
wherein the processor is configured to:
control the communication device to scan the wireless communication apparatuses based on receiving an off command to turn off the vehicle by the input device; and
control the memory to store the print pattern corresponding to the constellation map generated based on the scan of the wireless communication apparatuses as a first reference print pattern corresponding to a first reference constellation map.

3. The vehicle according to claim 2, wherein the processor is configured to:
control the communication device to rescan the wireless communication apparatuses based on receiving the off command and regenerate the print pattern corresponding to the constellation map and the constellation map of the vehicle based on the rescanning of the wireless communication apparatuses;
control the activation of the digital key based on a match of the regenerated print pattern and the first reference print pattern; and
control deactivation of the digital key based on a mismatch of the regenerated print pattern and the first reference print pattern.

4. The vehicle according to claim 3, wherein the processor is configured to set a security level to a first level based on the match of the regenerated print pattern and the first reference print pattern.

5. The vehicle according to claim 3, wherein the processor is configured to:
receive a second reference print pattern corresponding to a second reference constellation map from the mobile device based on the off command and control the memory to store the received second reference print pattern corresponding to the second reference constellation map;
receive a print pattern of the mobile device corresponding to a constellation map of the mobile device regenerated by the mobile device from the mobile device based on an on command of the vehicle by the input device;
control the activation of the digital key based on a match of the received print pattern of the mobile device and the second reference print pattern; and
control the deactivation of the digital key based on a mismatch of the received print pattern of the mobile device and the second reference print pattern.

6. The vehicle according to claim 5, wherein the processor is configured to set a security level to a second level based on the match of the received print pattern of the mobile device and the second reference print pattern.

7. The vehicle according to claim 5, wherein the processor is configured to set a security level to a third level based on a match of the regenerated print pattern of the vehicle and the first reference print pattern and based on a match of the received print pattern of the mobile device and the second reference print pattern.

8. The vehicle according to claim 5, wherein the processor is configured to set a security level to a fourth level based on a match of the regenerated print pattern of the vehicle and the first reference print pattern, based on a match of the received print pattern of the mobile device and the second reference print pattern, and based on a match of the regenerated print pattern of the vehicle and the received print pattern of the mobile device.

9. The vehicle according to claim 2, wherein the processor is configured to:
   compare, based on an on command of the vehicle by the input device, a second reference print pattern of the mobile device corresponding to a second reference constellation map received from the mobile device with the first reference print pattern of the vehicle corresponding to the first reference constellation map stored in the memory;
   control the activation of the digital key based on a match of the second reference print pattern of the mobile device and the first reference print pattern of the vehicle; and
   control deactivation of the digital key based on a mismatch of the second reference print pattern of the mobile device and the first reference print pattern of the vehicle.

10. The vehicle according to claim 2, wherein the processor is configured to:
    identify, based on receiving the off command, a received signal strength of first type of wireless communication apparatuses received by the communication device;
    obtain relative distance information of the first type of wireless communication apparatuses based on the received signal strength of the first type of wireless communication apparatuses;
    generate the constellation map based on the relative distance information of the first type of wireless communication apparatuses; and
    generate the print pattern corresponding to the constellation map.

11. The vehicle according to claim 10, wherein the processor is configured to:
    identify, based on receiving the off command, a received signal strength and position information of second type of wireless communication apparatuses received by the communication device;
    obtain relative distance information of the second type of wireless communication apparatuses based on the received signal strength and the position information of the second type of wireless communication apparatuses;
    generate the constellation map based on the relative distance information of the second type of wireless communication apparatuses; and
    generate the print pattern corresponding to the generated constellation map, and
    wherein a second communication method of the second type of wireless communication apparatuses is different from a first communication method of the first type of wireless communication apparatuses.

12. The vehicle according to claim 11, wherein the processor is configured to identify identification information of the first and second types of wireless communication apparatuses, identify movable first and second types of wireless communication apparatuses based on the identified identification information of the first and second types of wireless communication apparatuses, and exclude the identified movable first and second types of wireless communication apparatuses from the first and second types of wireless communication apparatuses for generating the constellation map.

13. The vehicle according to claim 11, wherein the processor is configured to identify the first and second types of wireless communication apparatuses having the received signal strength less than a reference received signal strength among the first and second types of wireless communication apparatuses, and exclude the identified first and second types of wireless communication apparatuses from the first and second types of wireless communication apparatuses for generating the constellation map.

14. The vehicle according to claim 1, wherein the processor is configured to transmit the generated constellation map or the generated print pattern corresponding to the generated constellation map to a server.

15. A mobile device comprising:
    a memory configured to store a digital key to control a vehicle;
    a communication device configured to communicate with wireless communication apparatuses and the vehicle; and
    a processor configured to:
      obtain relative position information of the wireless communication apparatuses based on a received signal strength of the wireless communication apparatuses received by the communication device;
      generate a constellation map based on the obtained relative position information of the wireless communication apparatuses;
      generate a print pattern corresponding to the constellation map based on a position of the mobile device;
      control the memory to store the generated print pattern corresponding to the constellation map; and
      control the communication device to transmit the generated print pattern corresponding to the constellation map to the vehicle.

16. The mobile device according to claim 15, wherein the processor is configured to:
    control, based on receiving an on command of the vehicle from the communication device, the communication device to scan the wireless communication apparatuses and control the memory to store the print pattern corresponding to the constellation map generated based on the scanning of the wireless communication apparatuses as a second reference print pattern corresponding to a second reference constellation map; and
    control, based on scanning the vehicle, the communication device to rescan the wireless communication apparatuses;
    regenerate the print pattern corresponding to the constellation map and the constellation map of the vehicle based on the rescanning of the wireless communication apparatuses; and
    control the communication device to transmit the regenerated print pattern corresponding to a regenerated constellation map to the vehicle.

17. The mobile device according to claim 16, wherein the processor is configured to:

identify, based on receiving an off command of the vehicle from an input device, a received signal strength of first type of wireless communication apparatuses received by the communication device;

obtain relative distance information of the first type of wireless communication apparatuses based on the received signal strength of the first type of wireless communication apparatuses;

generate the constellation map based on the relative distance information of each of the first type of wireless communication apparatuses; and generate the print pattern corresponding to the constellation map.

18. The mobile device according to claim 17, wherein the processor is configured to:

identify, based on receiving the off command, a received signal strength and position information of second type of wireless communication apparatuses received by the communication device;

obtain relative distance information of the second type of wireless communication apparatuses based on the received signal strength and the position information of the second type of wireless communication apparatuses;

generate the constellation map based on the relative distance information of the second type of wireless communication apparatuses; and generate the print pattern corresponding to the constellation map, and wherein a second communication method of the second type of wireless communication apparatuses is different from a first communication method of the first type of wireless communication apparatuses.

19. The mobile device according to claim 18, wherein the processor is configured to identify identification information of the first and second types of wireless communication apparatuses, identify movable first and second types of wireless communication apparatuses based on the identified identification information of the first and second types of wireless communication apparatuses, and exclude the identified movable first and second types of wireless communication apparatuses from the first and second types of wireless communication apparatuses for generating the constellation map.

20. The mobile device according to claim 18, wherein the processor is configured to identify the first and second types of wireless communication apparatuses having the received signal strength less than a reference received signal strength among the first and second types of wireless communication apparatuses, and exclude the identified first and second types of wireless communication apparatuses from the first and second types of wireless communication apparatuses for generating the constellation map.

* * * * *